(12) United States Patent
Courchesne et al.

(10) Patent No.: US 12,455,002 B2
(45) Date of Patent: Oct. 28, 2025

(54) AIR INTAKE ASSEMBLY AND VEHICLE HAVING AIR INTAKE ASSEMBLY

(71) Applicant: BOMBARDIER RECREATIONAL PRODUCTS INC., Valcourt (CA)

(72) Inventors: Mathieu Courchesne, Sherbrooke (CA); Patrick Mathieu, Shefford (CA); Matthew Coffey, Montreal (CA); Charles Devin, Windsor (CA); Brahim Anezmam, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/544,080

(22) Filed: Dec. 18, 2023

(65) Prior Publication Data

US 2024/0200648 A1 Jun. 20, 2024

Related U.S. Application Data

(60) Provisional application No. 63/433,558, filed on Dec. 19, 2022.

(51) Int. Cl.
| | |
|---|---|
| *F16H 57/04* | (2010.01) |
| *F16H 57/02* | (2012.01) |
| *F16H 57/027* | (2012.01) |

(52) U.S. Cl.
CPC ....... *F16H 57/0416* (2013.01); *F16H 57/027* (2013.01); *F16H 57/0489* (2013.01); *B60Y 2200/124* (2013.01); *B60Y 2200/20* (2013.01); *F16H 2057/02056* (2013.01)

(58) Field of Classification Search
CPC ..... F16H 57/04; F16H 57/0489; F16H 57/027
USPC .......................................................... 474/93
See application file for complete search history.

(56) References Cited

U.S. PATENT DOCUMENTS

| | | | | |
|---|---|---|---|---|
| 5,086,858 | A * | 2/1992 | Mizuta | F02M 35/162 55/385.3 |
| 11,181,080 | B2 * | 11/2021 | Bouchard | B60K 13/02 |
| 11,391,361 | B2 * | 7/2022 | Leclair | F16H 57/027 |
| 2012/0031694 | A1 * | 2/2012 | Deckard | F16H 57/0489 29/402.03 |

(Continued)

FOREIGN PATENT DOCUMENTS

WO 2019129845 A1 7/2019

OTHER PUBLICATIONS

CAN-AM Parthouse, "OEM Parts—2019 CAN-AM Defender HD5—North America Engine—HD5", retrieved from https://www.canampartshouse.com/oemparts/a/cam/62a8ec044f44ee6bd775b9c7/engine-hd5 on Dec. 5, 2023.

*Primary Examiner* — Anna M Momper
*Assistant Examiner* — Mark K Buse
(74) *Attorney, Agent, or Firm* — BCF LLP

(57) ABSTRACT

A vehicle has: a frame; a ground engaging member operatively connected to the frame; an engine connected to the frame; a continuously variable transmission (CVT) operatively connected to the engine; a CVT housing housing the CVT; a cockpit area defined at least in part by the frame; an air intake assembly fluidly connected to the CVT housing. The air intake assembly comprises an air intake duct body having: an air intake duct outlet in fluid communication with an inside of the CVT housing; and at least two intake duct inlets which take air in different places.

20 Claims, 20 Drawing Sheets

(56) References Cited

U.S. PATENT DOCUMENTS

| | | | |
|---|---|---|---|
| 2013/0087396 A1* | 4/2013 | Itoo | F02M 35/162 |
| | | | 180/68.3 |
| 2018/0222311 A1* | 8/2018 | Toupin | F02M 35/10157 |
| 2019/0078679 A1* | 3/2019 | Leclair | B60K 13/02 |
| 2019/0210668 A1* | 7/2019 | Endrizzi | B60K 13/04 |
| 2019/0383248 A1* | 12/2019 | Bouchard | F02M 35/162 |
| 2021/0207704 A1* | 7/2021 | Allicock | F16H 57/027 |
| 2023/0339309 A1* | 10/2023 | Nakamura | B60K 13/02 |
| 2023/0341045 A1* | 10/2023 | Nakamura | F16H 57/0489 |

* cited by examiner

AIR INTAKE ASSEMBLY AND VEHICLE HAVING AIR INTAKE ASSEMBLY

CROSS-REFERENCE

The present application claims priority to U.S. Provisional Application No. 63/433,558, filed on Dec. 19, 2022, entitled "AIR INTAKE ASSEMBLY AND VEHICLE HAVING AIR INTAKE ASSEMBLY", the entirety of which is incorporated herein by reference.

FIELD OF TECHNOLOGY

The present technology relates to air intake assemblies for vehicles, and vehicles having an air intake assembly.

BACKGROUND

Side-by-side vehicles (SSVs) are four-wheeled vehicles having an internal combustion engine, designed for off-road use. They have a driver seat and a passenger seat disposed side-by-side inside a passenger area defined in part by a roll cage. Some SSVs also have a second row of two or more seats. In order to allow for additional storage, some SSVs are also provided with a cargo box at the rear thereof.

As would be understood, in order to operate, the internal combustion engine of a SSV needs to be supplied with air. This air needs to be as free as possible of dust, debris and water, otherwise the engine will not operate as efficiently as it could and there is also a risk of damaging the engine. Since SSVs operate in off-road conditions, the environment in which they operate tends to be dustier, to have more debris and to be wetter than the environment in which on-road vehicles typically operate. The off-road environment therefore makes the desired supply of fresh air to the engine difficult.

Also, many SSVs use a continuously variable transmission (CVT) to transfer torque from the engine to the wheels. The components of the CVT can get hot during operation. As such, it is desirable to cool these components. One way of cooling these components is to supply air to the CVT so as to air-cool its components. However, this air should also be as free as possible of dust, debris and water. As discussed above, the off-road environment in which SSVs operate make this difficult.

Furthermore, side-by-side off-road vehicles are generally narrower and shorter than on-road vehicles such as cars. As such, there is less space available to dispose the various components that would be needed to supply clean air to the engine and the components that would be needed to supply clean air to the CVT.

Thus there is a desire for an arrangement of components for supplying air to the engine and to the CVT that is suitable for the operating conditions and limited overall dimensions of side-by-side off-road vehicles.

SUMMARY

It is an object of the present technology to ameliorate at least some of the inconveniences present in the prior art.

According to one aspect of the present technology, there is provided a vehicle comprising: a frame: at least one ground engaging member operatively connected to the frame: an internal combustion engine connected to the frame: a continuously variable transmission (CVT) operatively connected to the engine: a CVT housing housing the CVT: a cockpit area defined at least in part by the frame: an air intake assembly fluidly connected to the CVT housing, the air intake assembly comprising an air intake duct body having: an air intake duct outlet in fluid communication with an inside of the CVT housing: at least two intake duct branches, each intake duct branch having a respective intake duct branch inlet, wherein a first intake duct branch of the at least two intake duct branches is in fluid communication with the cockpit area to fluidly connect an inside of the CVT housing with the cockpit area, the first intake duct branch having a first intake duct branch inlet.

In some implementations of the present technology, the vehicle further comprises a firewall between the cockpit area and the internal combustion engine, wherein the first intake duct branch is fluidly connected to the cockpit area through a firewall opening defined in the firewall.

In some implementations of the present technology, the first intake duct branch is connected to a rear side of the firewall. In some implementations of the present technology, a second intake duct branch of the at least two intake duct branches is disposed outside of the cockpit area, the second intake duct branch having a second intake duct branch inlet.

In some implementations of the present technology, the first intake duct branch inlet of the first intake duct branch has an area which is smaller than the second intake duct branch inlet of the second intake duct branch.

In some implementations of the present technology, the first intake duct branch 84 has a first intake duct axis which is normal to a plane of the first intake duct branch inlet, and the second intake duct branch has a second intake duct axis which is normal to a plane of the second intake duct branch inlet, the first intake duct axis and the second intake duct axis being positioned at ≥85 degrees relative to each other.

In some implementations of the present technology, the second intake duct branch inlet of the second intake duct branch is aligned with an intake duct outlet axis of the air intake duct outlet, the intake duct outlet axis being normal to a plane of the air intake duct outlet.

In some implementations of the present technology, the first intake duct branch inlet is disposed rearward of a backrest of a driver seat in the cockpit area.

In some implementations of the present technology, the first intake duct branch inlet is disposed at a height below a headrest of the driver seat.

In some implementations of the present technology, the air intake duct body is disposed such that the first intake duct branch and the second intake duct branch are both positioned on a same side of a centreline of the vehicle.

In some implementations of the present technology, the air intake assembly is removably connected to the CVT housing.

In some implementations of the present technology, the air intake assembly further comprises an attachment member for removably connecting the air intake assembly to the CVT housing.

In some implementations of the present technology, the air intake assembly further comprises a cap for selectively covering the first intake duct branch inlet of the first intake duct branch.

In some implementations of the present technology, the air intake assembly further comprises a tether connecting the cap to the first intake duct branch.

In some implementations of the present technology, the air intake assembly further comprises a grill which is attachable to the first intake duct branch inlet of the first intake duct branch.

In some implementations of the present technology, the first intake duct branch extends generally longitudinally.

In some implementations of the present technology, the vehicle is an all-terrain vehicle: the at least one ground engaging member comprises four wheels connected to the frame, at least two of the four wheels being operatively connected to and driven by the internal combustion engine.

From another aspect, there is provided an air intake assembly which is configured to be fluidly connectable to a continuously variable transmission (CVT) housing housing a CVT of a vehicle, the vehicle having: a frame: at least one ground engaging member operatively connected to the frame: an internal combustion engine connected to the frame; the CVT operatively connected to the engine: a cockpit area defined at least in part by the frame: the air intake assembly comprising an air intake duct body having: an air intake duct outlet configured to be in fluid communication with an inside of the CVT housing when the air intake assembly is connected to the CVT housing: at least two intake duct branches, each intake duct branch having a respective intake duct branch inlet, wherein a first intake duct branch of the at least two intake duct branches is configured to be in fluid communication with the cockpit area when the air intake assembly is connected to the CVT housing to fluidly connect an inside of the CVT housing with the cockpit area, the first intake duct branch having a first intake duct branch inlet.

In some implementations of the present technology, a second intake duct branch of the at least two intake duct branches is configured to be disposed outside of the cockpit area, the second intake duct branch having a second intake duct branch inlet.

In some implementations of the present technology, the first intake duct branch inlet of the first intake duct branch has an area which is smaller than an area of the second intake duct branch inlet of the second intake duct branch.

In some implementations of the present technology, the first intake duct branch has a first intake duct axis which is normal to a plane of the first intake duct branch inlet, and the second intake duct has a second intake duct axis which is normal to a plane of the second intake duct branch inlet, the first intake duct axis and the second intake duct axis are positioned at ≥85 degrees relative to each other.

In some implementations of the present technology, the second intake duct branch inlet of the second intake duct branch is aligned with an intake duct outlet axis of the air intake duct outlet, the intake duct outlet axis being normal to a plane of the air intake duct outlet.

In some implementations of the present technology, the air intake assembly further comprises a cap for selectively covering the first intake duct branch inlet of the first intake duct branch.

From a yet further aspect, there is provided an air intake duct body for supplying air to a continuously variable transmission (CVT) housing housing a CVT of a vehicle, the air intake duct body comprising: an air intake duct outlet configured to be fluidly connected to the CVT: a first intake duct branch having a first intake duct branch inlet and a first intake duct branch outlet, and a second intake duct branch having a second intake duct branch inlet fluidly communicating with the air intake duct outlet, the first intake duct branch outlet being defined in the second intake duct branch for fluidly communicating the first intake duct branch with the second intake duct branch, the first intake duct branch and the second intake duct branch extending in different directions to one another.

From another aspect, there is provided a vehicle comprising: a frame: a vehicle body mounted to the frame: a driver seat mounted to the frame: at least one ground engaging member operatively connected to the frame: an internal combustion engine connected to the frame and housed within an engine compartment: a continuously variable transmission (CVT) operatively connected to the engine: a CVT housing housing the CVT: an air intake assembly fluidly connected to the CVT housing, the air intake assembly comprising an air intake duct body having: an outlet branch having formed therein an air intake duct outlet, the air intake duct outlet being in fluid communication with an inside of the CVT housing: an intake branch having formed therein: a first intake duct inlet in fluid communication with the air intake duct outlet, wherein the first intake duct inlet is disposed in the engine compartment: and a second intake duct inlet in fluid communication with the air intake duct outlet, wherein the second intake duct inlet is disposed outside of the engine compartment.

In some implementations of the present technology, the second intake duct inlet is defined in an end of the intake branch, and the first intake duct inlet is defined in a side of the intake branch.

In some implementations of the present technology, the first intake duct inlet and the second intake duct inlet face in different directions.

In some implementations of the present technology, the first intake duct inlet faces forwardly and the second intake duct inlet faces laterally.

In some implementations of the present technology, the first intake duct inlet faces upwardly.

In some implementations of the present technology, the first intake duct inlet has an area which is smaller than an area of the second intake duct inlet.

In some implementations of the present technology, the intake branch has an intake branch axis which is normal to a plane of the second intake duct inlet and the outlet branch has an outlet branch axis which is normal to a plane of the air intake duct outlet, the intake branch axis and the outlet branch axis being positioned at an angle relative to each other which is between 160 to 200 degrees.

In some implementations of the present technology, a plane of the first intake duct inlet is perpendicular to a plane of the second intake duct inlet.

In some implementations of the present technology, the first intake duct inlet is disposed rearward of a backrest of the driver seat of the vehicle.

In some implementations of the present technology, the first intake duct inlet is disposed at a height below a headrest of the driver seat.

In some implementations of the present technology, the first intake duct inlet is disposed to a side of the driver seat of the vehicle.

In some implementations of the present technology, the air intake duct body is disposed such that the intake branch and the outlet branch are both positioned on a same side of a longitudinally extending vertical center plane of the vehicle.

In some implementations of the present technology, the vehicle further comprises: a cockpit area defined at least in part by the frame: a firewall disposed between the cockpit area and the internal combustion engine: and a cargo box disposed above the internal combustion engine and rearward of the cockpit area: wherein the engine compartment is defined by the firewall, side panels of the vehicle body and the cargo box.

In some implementations of the present technology, the vehicle further comprises a firewall disposed longitudinally between the driver seat and the internal combustion engine;

and wherein the first intake duct inlet is disposed rearward of the firewall and forward of the internal combustion engine.

In some implementations of the present technology, the first intake duct inlet faces the firewall.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
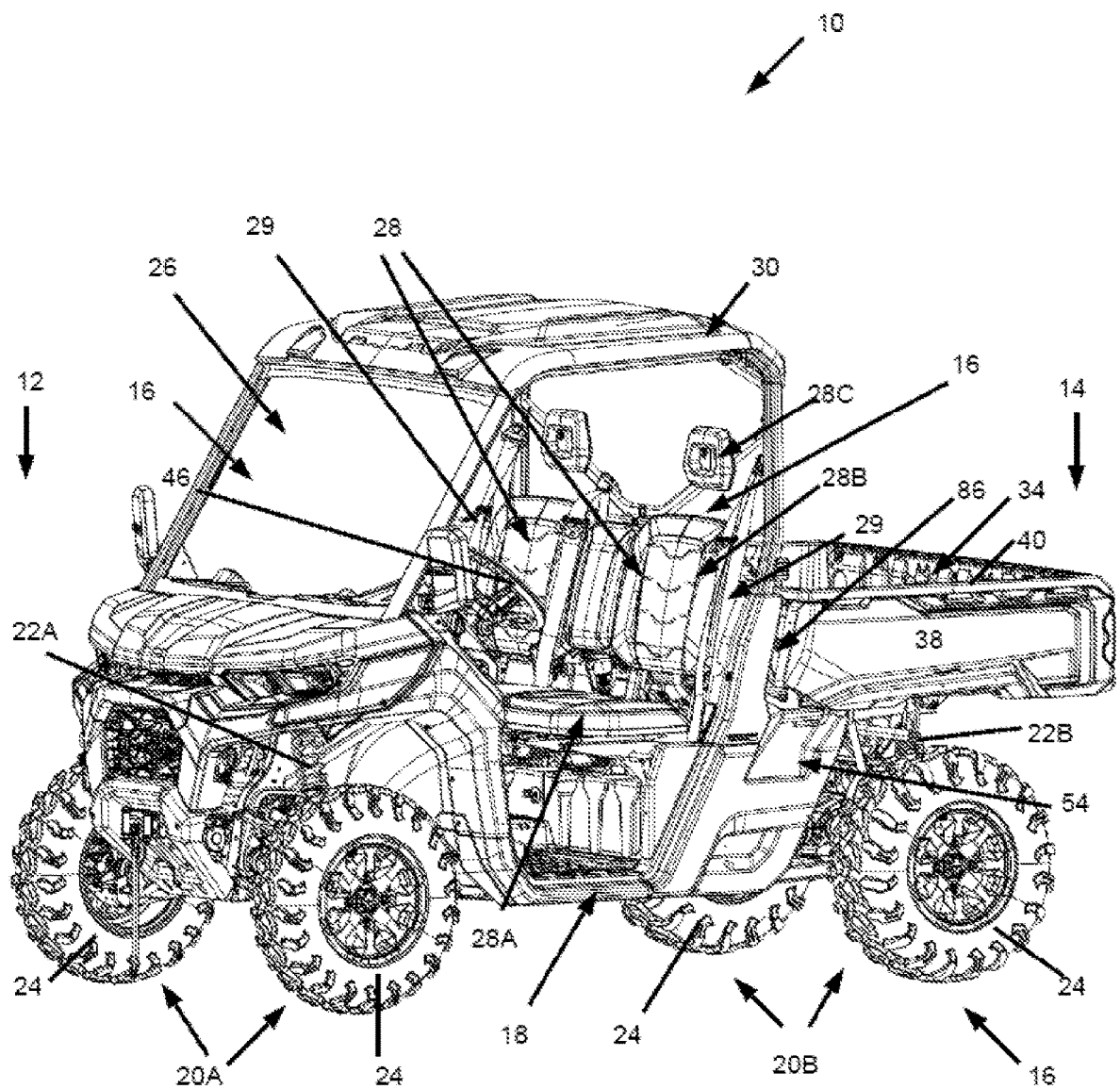
FIG. 1 is a perspective view taken from a front, left side of a side-by-side vehicle including an air intake assembly.
Figure 2:
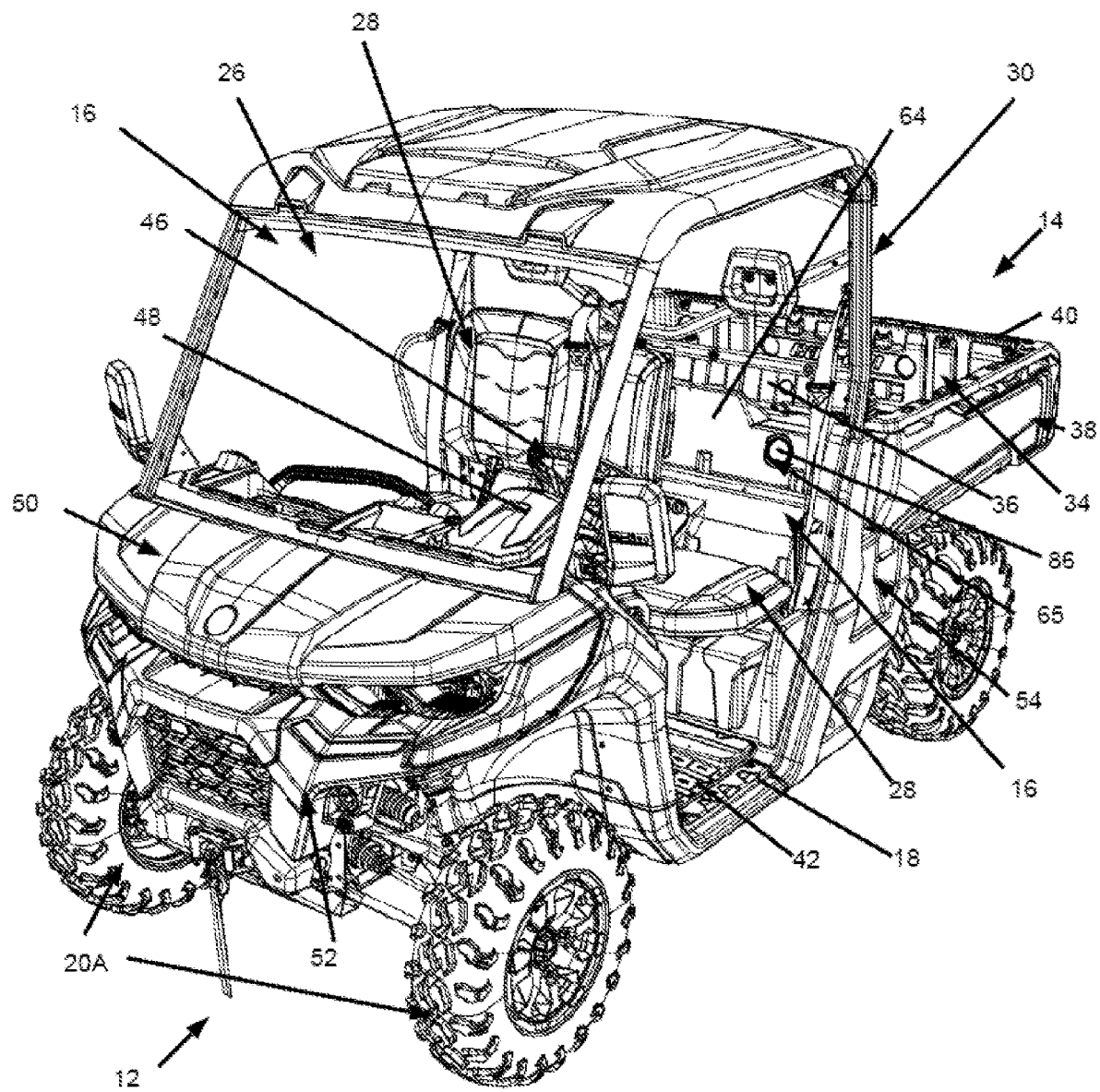
FIG. 2 is another perspective view taken from a front, left side of the side-by-side vehicle of FIG. 1 with a portion of a driver seat removed to show a portion of the air intake assembly.

A side-by-side vehicle (SSV) 10 is illustrated in FIGS. 1 and 2. The SSV 10 has a front end 12, a rear end 14, and two lateral sides 16 (left and right). The SSV 10 includes a frame 18. A pair of front wheels 20A is suspended from the front portion of the frame 18 via front suspension assemblies 22A. A pair of rear wheels 20B is suspended from the rear portion of the frame 18 via rear suspension assemblies 22B. Each of the four wheels 20A, 20B has a tire 24. A cockpit area 26 is disposed in the middle portion of the frame 18. Left and right seats 28 are connected to the middle portion of the frame 18. As can be seen in FIGS. 1 and 2, the seats 28 are disposed side-by-side in the cockpit area 26. Each seat 28 is a bucket seat having a seat base 28A and a backrest 28B. Each backrest 28B incorporates a headrest 28C. It is contemplated that the seats 28 could be other types of recumbent seats. Each seat 28 is also provided with a seat belt 29.

A roll cage 30 is connected to the frame 18 and is disposed above the cockpit area 26. The roll cage 30 is an arrangement of metal tubes that contributes to protecting the riders. The roll cage 30 has several attachment points to the frame 18. The cockpit area 26 is open at the two lateral sides 16 of the SSV 10, forming two lateral passages (left and right), through which the riders can ingress and egress the SSV 10. It is contemplated that doors could be provided in the two lateral passages to selectively partially close the lateral passages.

A cargo box 34 is mounted to the frame 18 rearward of the seats 28. It is contemplated that the cargo box 34 could be replaced by a cargo frame. In the present implementation, the cargo box 34 is fixed to the frame 18, but it is also contemplated that the cargo box 34 could be pivotally mounted to the frame 18. It is contemplated that in some implementations, the cargo box 34 could be omitted. The cargo box 34 has a front wall 36 (FIG. 2), two side walls 38, a rear wall 40 and a floor (not visible).

A steering device including a steering wheel 46 is disposed in front of the left seat 28. It is contemplated that the steering wheel 46 could be disposed in front of the right seat 28. The steering device is operatively connected to the two front wheels 20A to permit steering of the SSV 10. A display cluster 48 (FIG. 2) is disposed in front of the steering wheel 46. A throttle operator in the form of a throttle pedal (not shown) is disposed over the floor 42 of the cockpit area 26 below the steering wheel 46 and in front of the left seat 28.

The SSV 10 has a vehicle body mounted to the frame 18. The vehicle body includes a hood 50, a front body panel 52, a rear body panel (not shown), a number of side body panels 54 including a right side body panel and a left side body panel 54. It is contemplated that the hood 50, the front body panel 52, side body panels 54 and the rear body panel could each be replaced by multiple panels. It is also contemplated that the vehicle body of the SSV 10 could have more or less body panels than described above.

Figure 3:
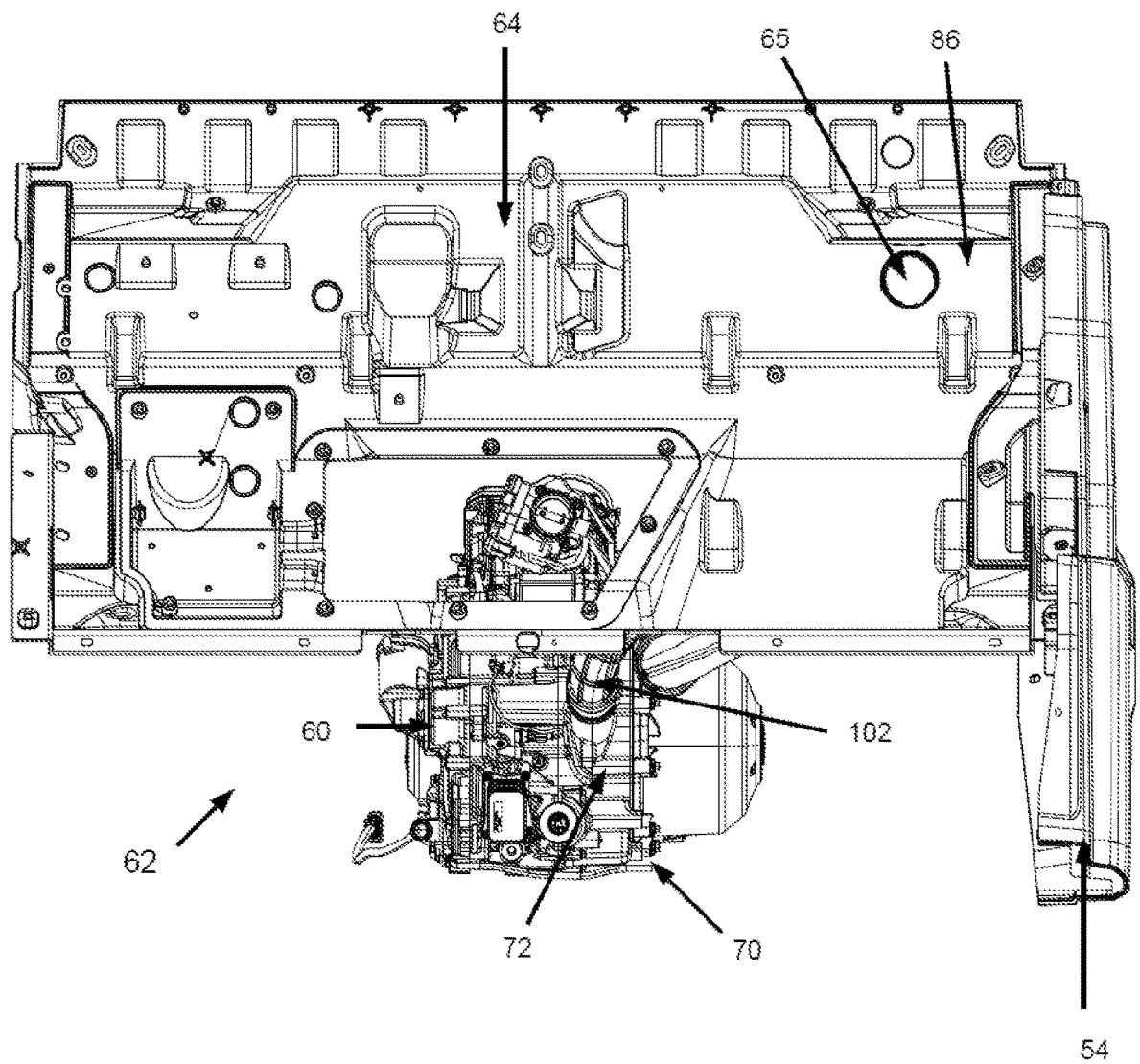
FIG. 3 is a front view of the vehicle of FIG. 2 with a front portion of the vehicle removed to show a front side of a firewall, a continuously variable transmission (CVT) housing rearward of the firewall, an engine and the portion of the air intake assembly.

The SSV 10 is powered by an internal combustion engine 60 which is housed in an engine compartment 62. The engine 60 is disposed rearward of the seat bases 28A, below the cargo box 34, and within the vehicle body. A firewall 64 (FIGS. 2-4) is disposed between the seats 28 and the engine 60. It can be said that the engine compartment 62 is defined by the cargo box 34, firewall 64 and side panels 54. The engine is a four-stroke, V-type engine having two cylinders. Other configurations of the engine 60 are contemplated.

The engine 60 drives a continuously variable transmission (CVT) 70 (FIGS. 3-6) disposed on a left side of the engine 60. A CVT housing 72 is provided which houses the CVT 70. The CVT 70 is operatively connected to the engine 60 and comprises a primary pulley (not shown), a secondary pulley (not shown) and a belt (not shown). The CVT 70 is also operatively connected to a transaxle (not shown) to transmit torque from the engine 60 to the transaxle. The primary pulley is mounted to an output shaft (not shown) of the engine 60. The secondary pulley is mounted to an input shaft (not shown) of the transaxle. The belt is looped around the primary and secondary pulleys. Air is supplied to the housing 72 to cool the CVT 70 via an air intake assembly 80 which will be described below with reference to FIGS. 3-11.

The CVT 70 drives the transaxle and the transaxle drives the two rear wheels 20B via two half-shafts (not shown). The driveshaft drives other driveshafts (not shown) that drive a front differential (not shown) at the front of the SSV 10. The front differential drives the two front wheels 20A via two half-shafts (not shown). It is contemplated that the engine 60 could drive the wheels 20A, 20B of the SSV 10 by means other than the ones described above. It is also contemplated that only two of the four wheels 20A, 20B could be driven by the engine 60.

Fuel to be delivered to the engine is stored in a fuel tank (not shown). The fuel tank is disposed to the right of the engine and in part rearward of the seat base 28A. A front portion of the fuel tank is disposed under the right seat base 28A. The fuel tank has a filler neck that extends upward and to the right through the rear right fender below the aperture and defines the fuel tank inlet. A removable fuel cap covers the fuel tank inlet at the end of the filler neck. The fuel cap is received in a recess defined in the side of the rear right fender. It is contemplated that the fuel tank could be disposed on the left side of the engine.

Exhaust gases are expelled from the engine via an exhaust system (not shown). The exhaust system includes a muffler that extends laterally below the cargo box 34 and has an outlet that faces rearward on a right side of the SSV 10. It is contemplated that an exhaust system that differs from the one described herein could be used.

Turning now to FIGS. 2 to 12, the air intake assembly 80 supplying air to the CVT 70 will be described. The air intake assembly 80 comprises an air intake duct body 82 defining passageways through which air can flow from the atmosphere to an interior of the CVT housing 72 to cool components of the CVT 70. According to embodiments of the present technology, the air intake assembly 80 is configured such that air can flow from the cockpit area 26 as well as from an area outside of the cockpit area 26 into the CVT housing 72, more specifically from above the side panel 54. Advantageously, as the atmosphere in the cockpit may be relatively clean, air which is as free as possible of dust, debris and water can be supplied to the CVT 70.

More specifically, the air intake duct body 82 comprises a first intake duct branch 84 having a first intake duct branch inlet 86, and a second intake duct branch 88 having a second intake duct branch inlet 90. An air intake duct outlet 92 is defined in an outlet branch 93 which is fluidly connected to first intake duct branch 84 and the second intake duct branch 88, such that air flowing in through one or both of the first intake duct branch inlet 86 and the second intake duct branch inlet 90 will flow out of the air intake duct outlet 92. The first intake duct branch 84 has a first intake duct branch outlet (not shown) which is defined in the second intake duct branch 88 for fluidly communicating the first intake duct branch 84 with the second intake duct branch 88. The first intake duct branch 84 and the second intake duct branch 88 extend in different directions to one another.

The air intake duct outlet 92 is fluidly connected to the CVT 70 via a first air intake conduit 100 which is fluidly connected to a second air intake conduit 102. The connection of the air intake duct body 82 to the first air intake conduit 100 is a removeable connection and utilizes an attachment member 94 which is a hose clamp as shown. It is contemplated that first intake conduit 100 and the second air intake conduit 102 may have a different configuration. It is also contemplated that the connection of the air intake duct body 82 to the first air intake conduit 100 can use another type of attachment member 94 such as a pipe clip, or can be in any other manner, such as using a screw connection between the air intake duct outlet 92 and the first air intake conduit 100.

The first intake duct branch 84 has a first intake duct axis 87 which is normal to a plane of the first intake duct branch inlet 86. The second intake duct branch 88 has a second intake duct axis 89 which is normal to a plane of the second intake duct branch inlet 90. The first intake duct axis 87 and the second intake duct axis 89 are not aligned with one another, and have a relative angle A which is more than zero degrees. As can be see in FIG. 9, from a top plan view, the relative angle A between the first intake duct axis 87 and the second intake duct axis 89 is more than or equal to about 85 degrees relative to each other, such as 90 degrees. In the present embodiment, the angle A is 90 degrees.

Figure 9:
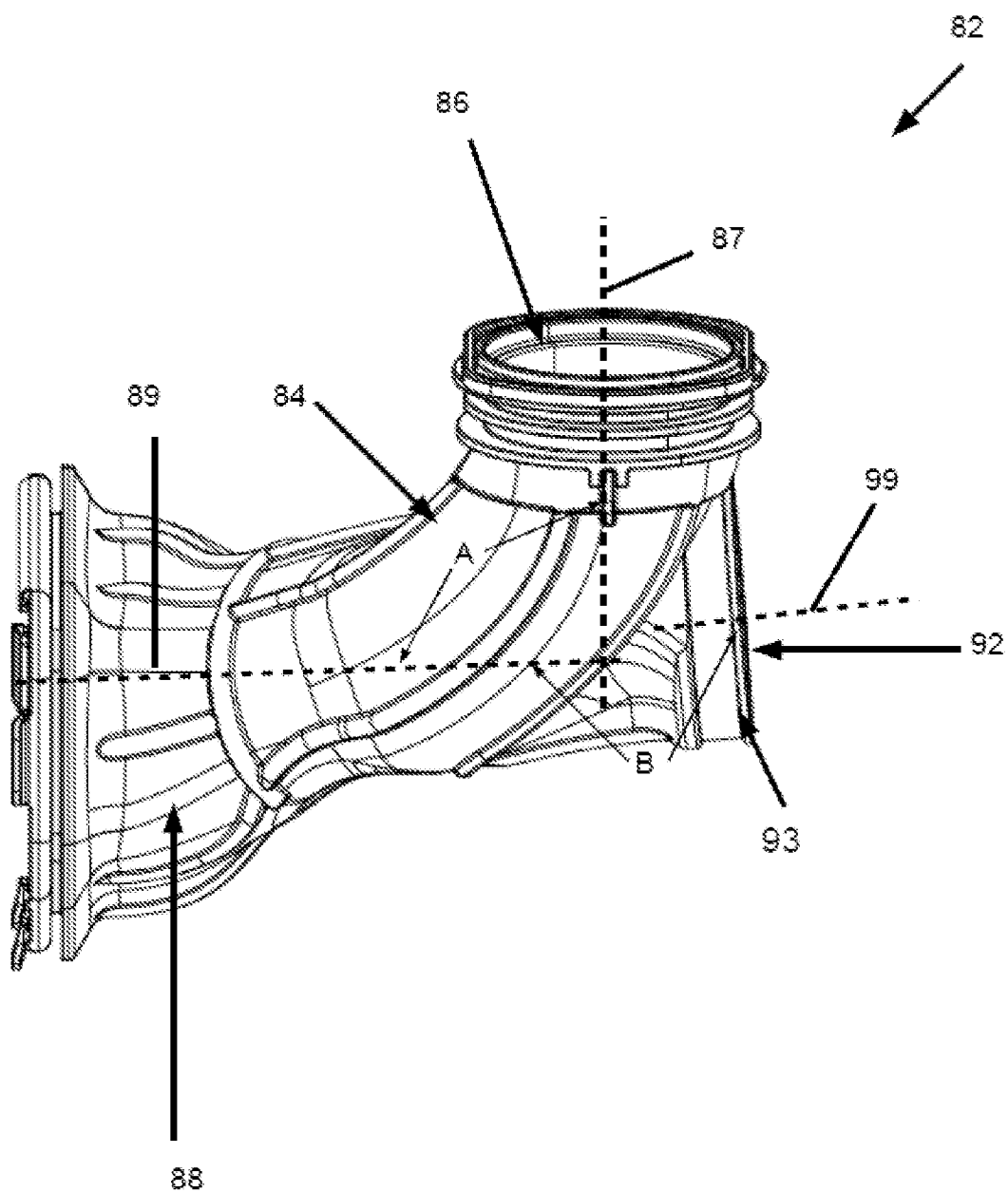
FIG. 9 is a top view of the air intake duct body of FIG. 7.

The air intake duct outlet 92 has an intake duct outlet axis 99 which is normal to a plane of the air intake duct outlet 92. The second intake duct branch axis 89 and the intake duct outlet axis 99 are aligned with each other and are parallel or nearly parallel. As can be seen in FIG. 9), the relative angle B between the intake duct branch axis 89 and the intake duct outlet axis 99 is about 184.7 degrees, and in some embodiments 180 degrees. It is contemplated that the angle B could be from 160 degrees to 200 degrees. An angle between the first intake duct axis 87 and the intake duct outlet axis 99 is 85.3 degrees.

Figure 8:
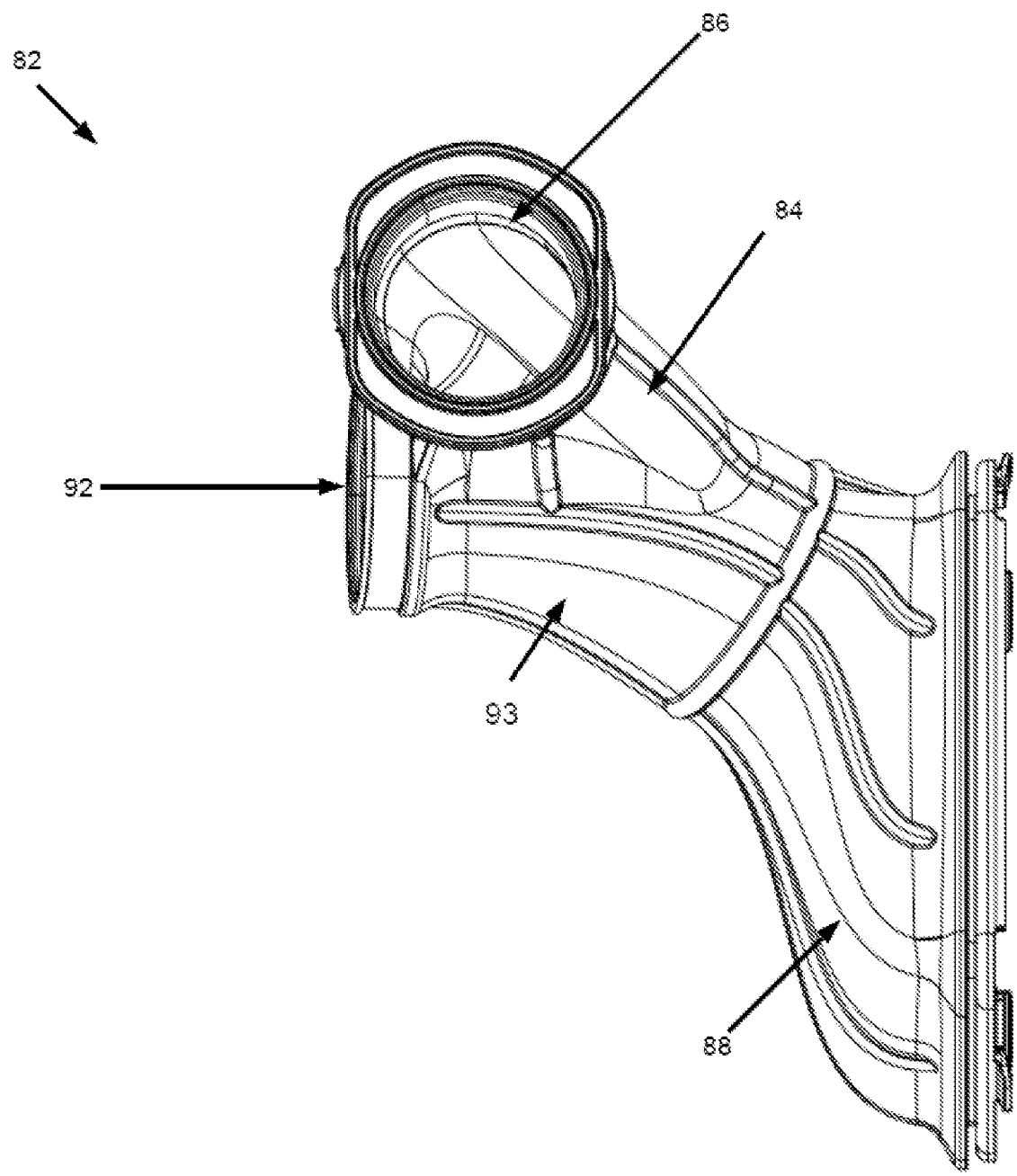
FIG. 8 is a front view of the air intake duct body of FIG. 7.
Figure 10:
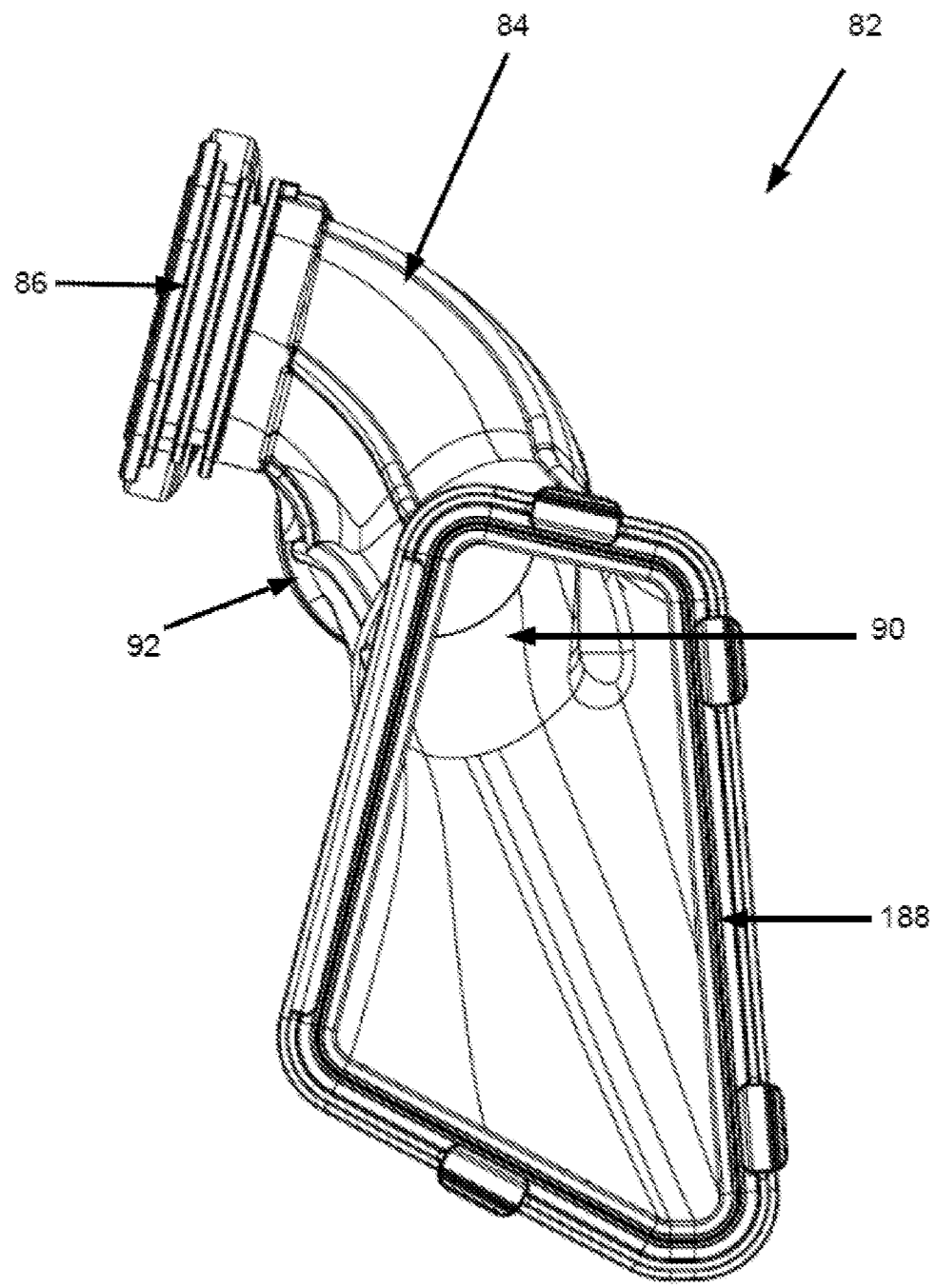
FIG. 10 is a left side view of the air intake duct body of FIG. 7.

As best seen in FIGS. 8 and 10, the second intake duct branch inlet 90 has a perimeter which is trapezoidal in shape, whereas the first intake duct branch inlet 86 has a perimeter which is circular in shape. An area of the first intake duct branch inlet 86 is smaller than an area of the second intake duct branch inlet 90.

Figure 4:
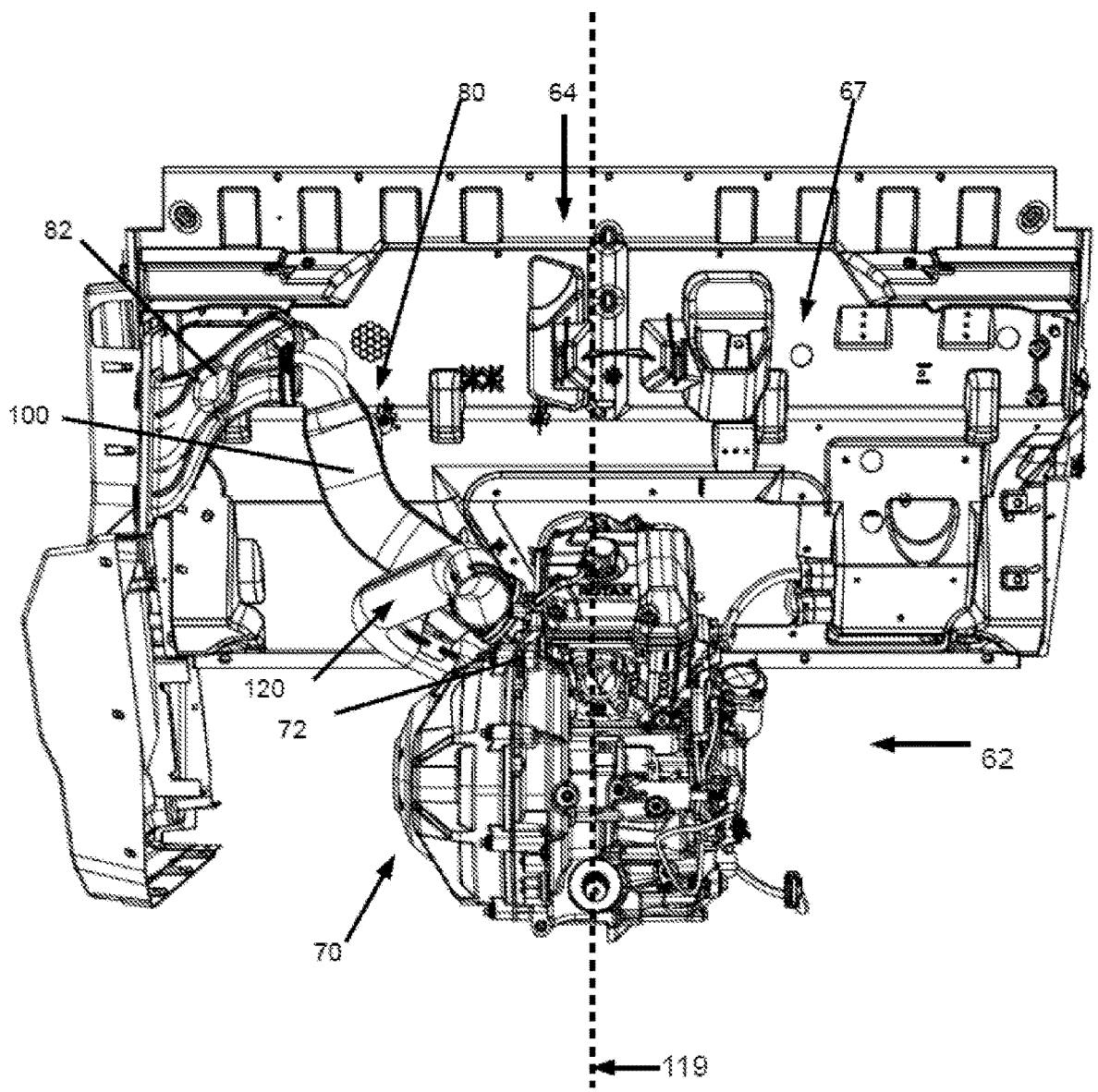
FIG. 4 is a rear view of the firewall, CVT housing, the engine and the air intake assembly of FIG. 3.
Figure 5:
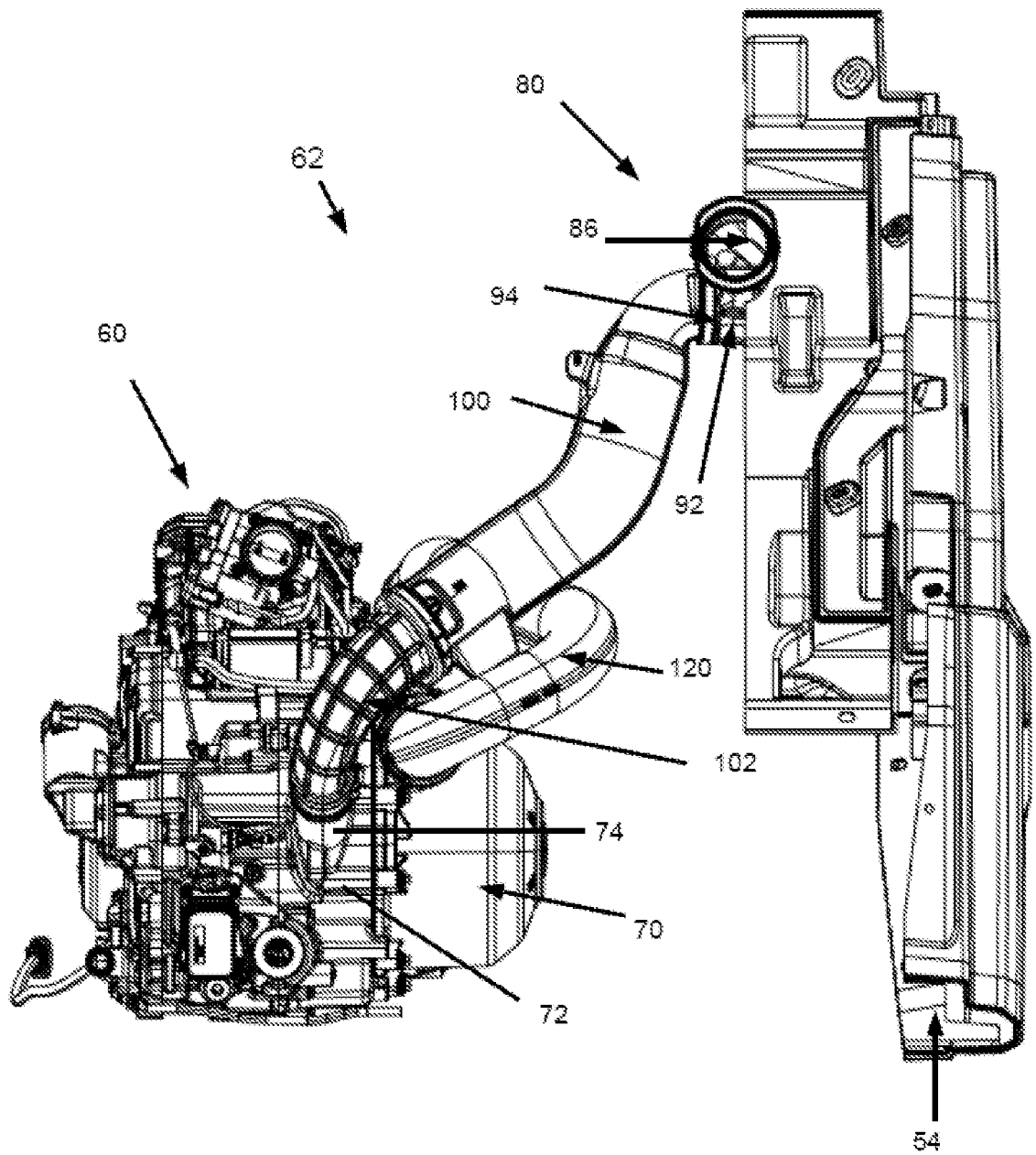
FIG. 5 is the front view of FIG. 3 with the firewall removed to show a front view of the air intake assembly, the engine and the CVT housing.
Figure 6:
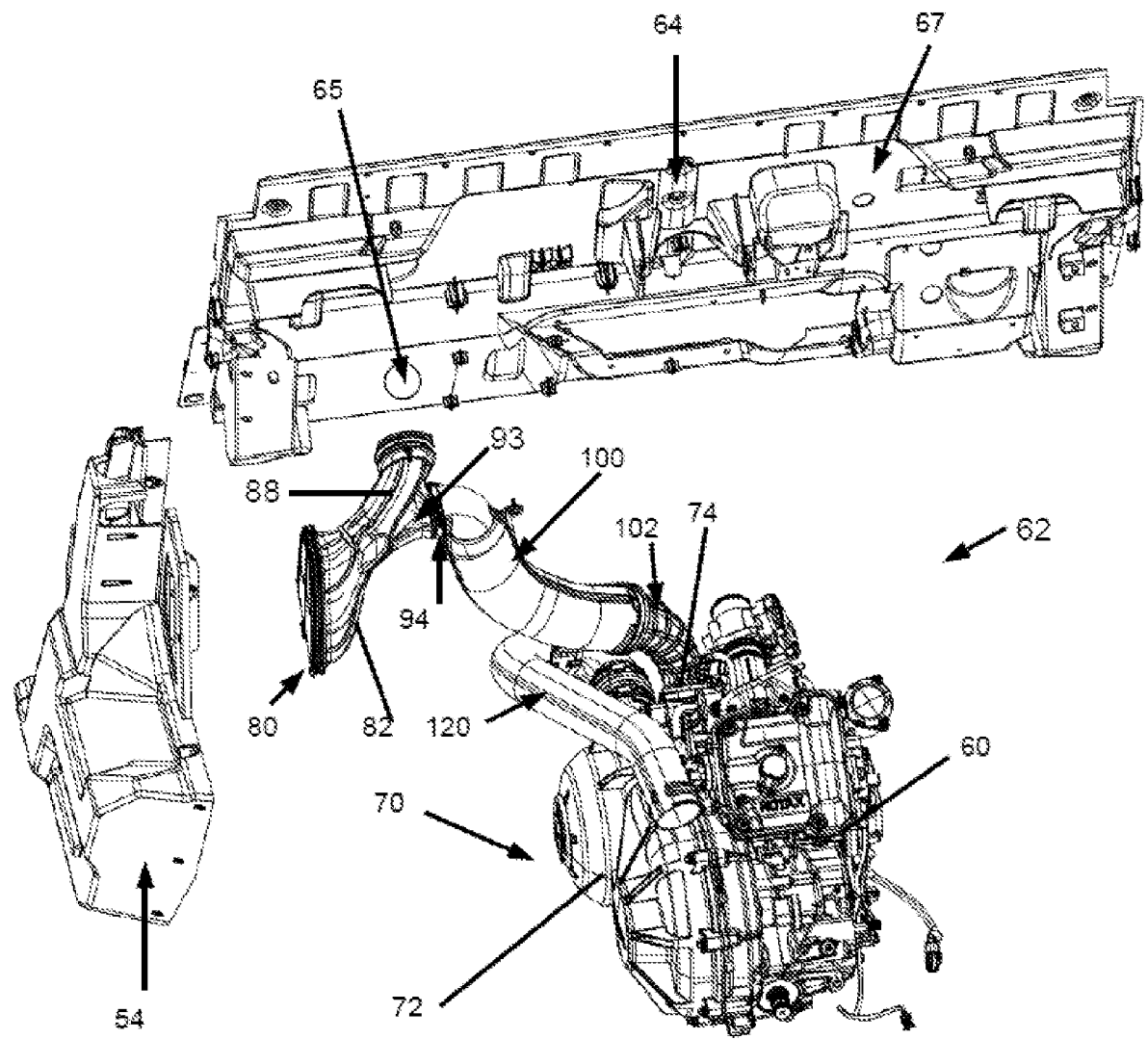
FIG. 6 is an exploded perspective view of FIG. 4 with part of the firewall removed.
Figure 7:
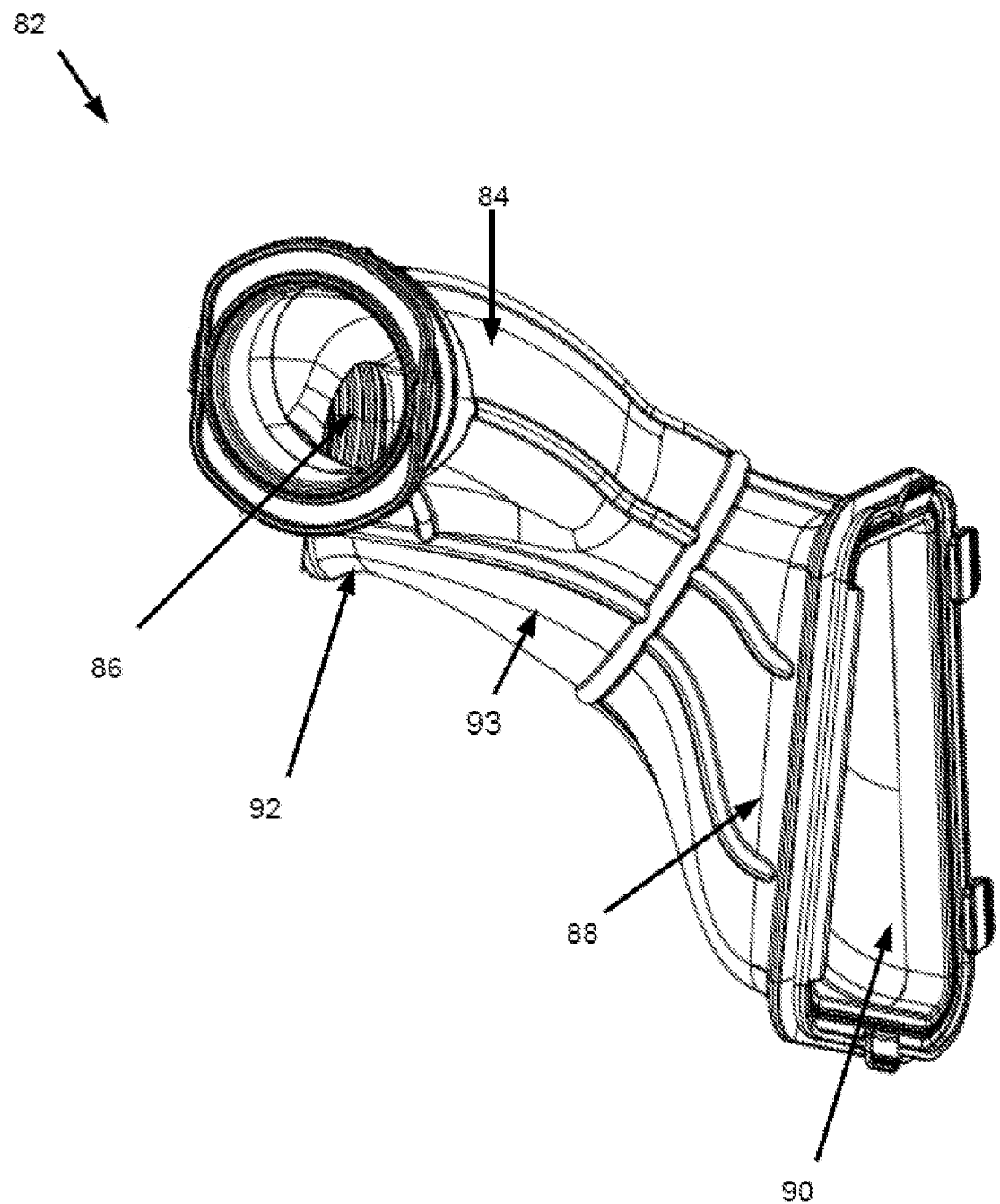
FIG. 7 is a perspective view from a front, left side of an air intake duct body of the air intake assembly of FIG. 3.

When the air intake assembly 80 is connected to the CVT 70, the first intake duct branch 84 extends generally longitudinally towards the cockpit area 26 and is in fluid communication with the cockpit area 26 to fluidly connect an inside of the CVT housing 72 with the cockpit area 26. The first intake duct branch 84 is fluidly connected to the cockpit area 26 through a firewall opening 65 defined in the firewall 64. The first intake duct branch 84 is connected to a rear face 67 of the firewall 64 around the firewall opening 65 such that fluid flowing from the cockpit area 26 through the firewall opening 65 will flow into the first intake duct branch 84. The first intake duct branch inlet 86 is disposed behind the backrest 28B of the driver seat 28, and below the headrest 28C. This position of the first intake duct branch 84 helps with delivering of clean air to the CVT 70. It is contemplated that the first intake duct branch 84 may extend through the firewall opening 65. As best seen in FIG. 4, the air intake duct body 82 is disposed such that the first intake duct branch 84 and the second intake duct branch 88 are both positioned on a same side of a longitudinally extending vertical center plane 119 of the vehicle.

The second intake duct branch 88 extends generally laterally. The second intake duct branch inlet 90 is therefore in fluid communication with the atmosphere outside of the cockpit area 26. The second intake duct branch inlet 90 fluidly connects with the atmosphere through the left side panel 54 of the SSV 10 and generally faces towards the left of the SSV 10. The air intake duct outlet 92 and the first air intake conduit 100 form a gooseneck (curved with an apex near a top end thereof) to reduce a likelihood of water droplets entering the CVT housing 72.

An exhaust conduit 120 is provided which extends from the CVT housing 72.

Figure 11:
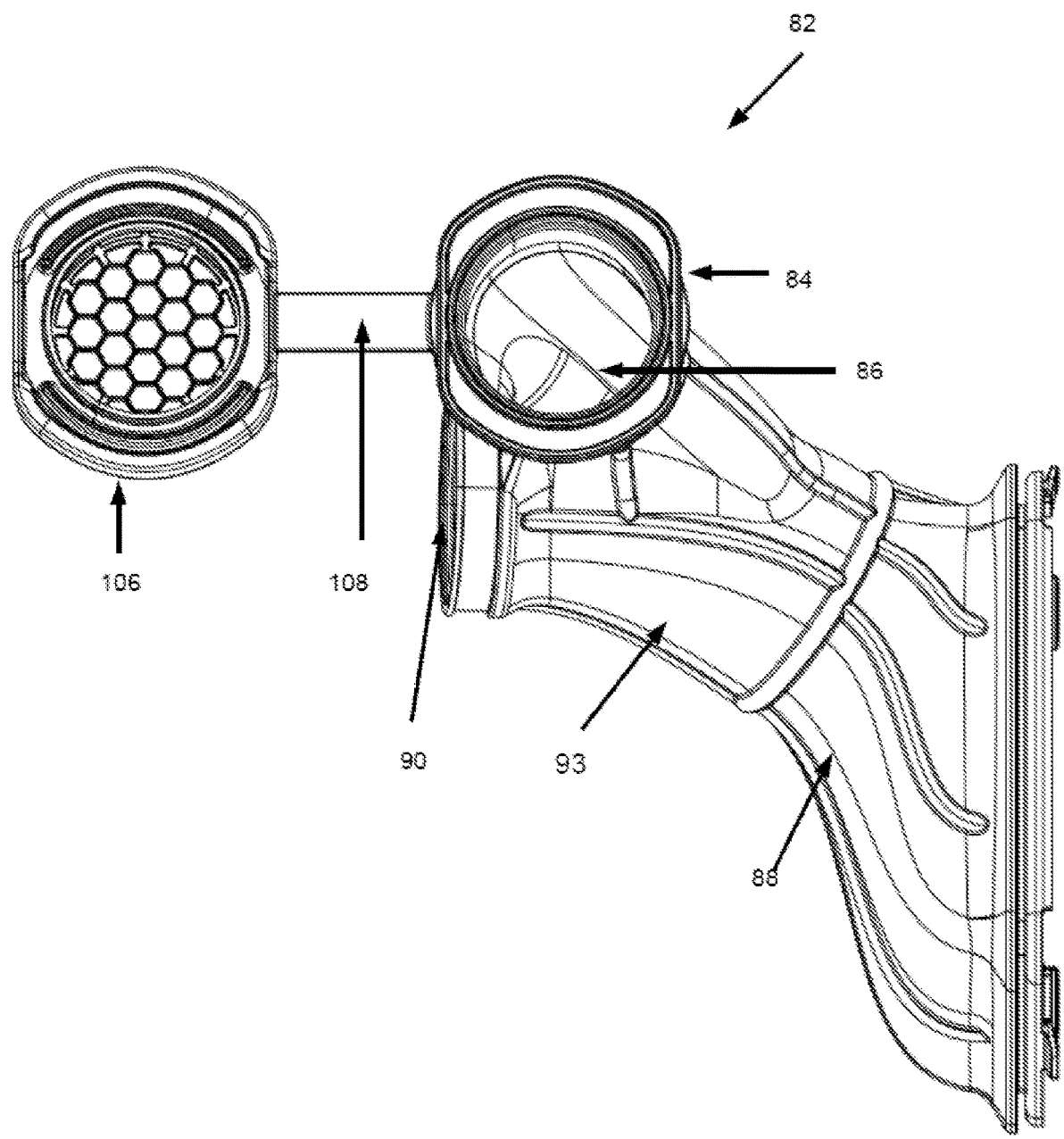
FIG. 11 is a front view of the air intake duct body of FIG. 7 provided with a grille.

Referring now to FIG. 11, in certain embodiments, the first intake duct branch 84 is provided with a honeycomb grille 106 for selectively covering the first intake duct branch inlet 86. The honeycomb grille 106 is movably connected to the first intake duct branch 84 by a grille tether 108. It is contemplated that the second intake duct branch 88 may also be provided with a grille (not shown).

Figure 12:
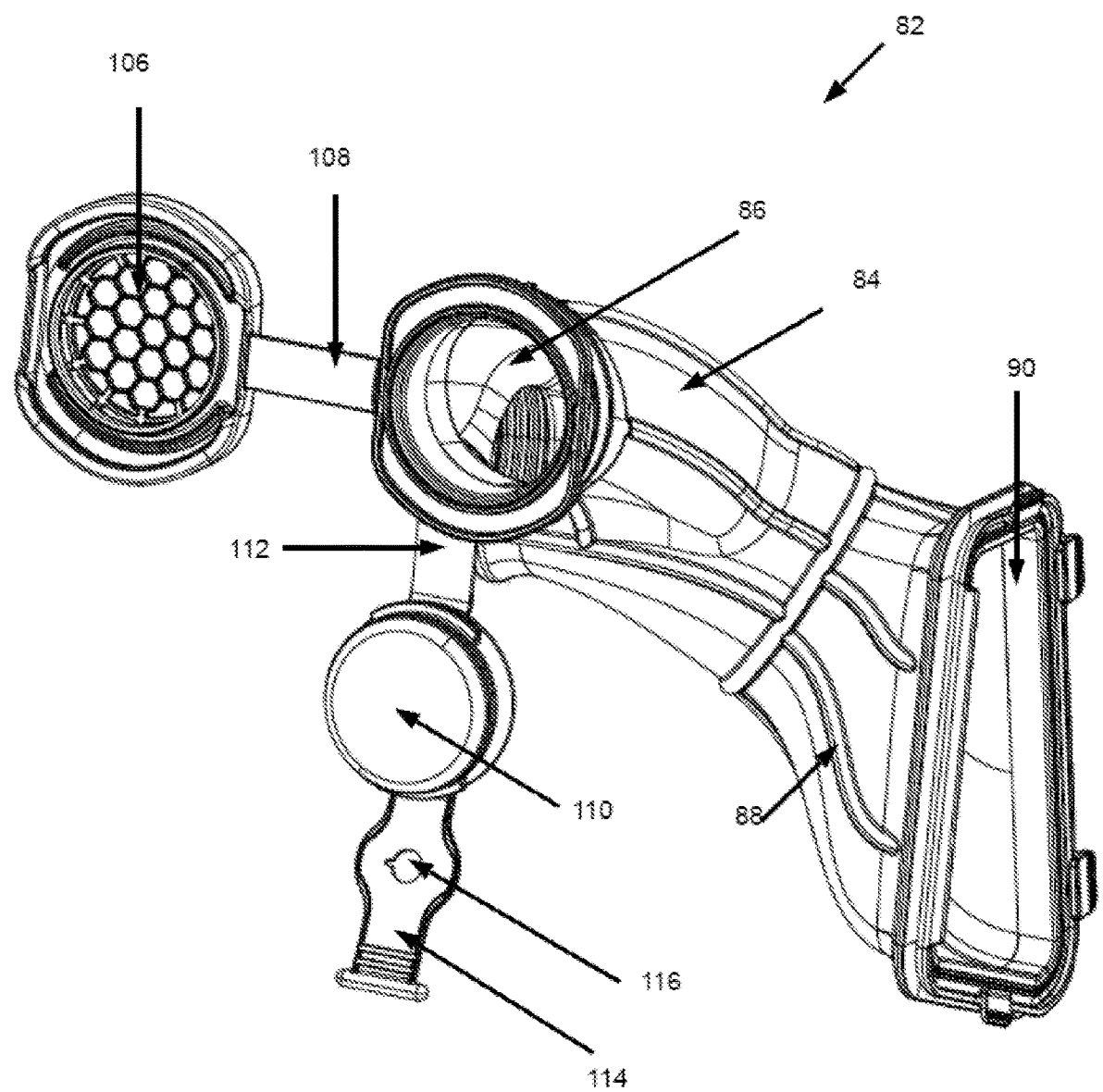
FIG. 12 is a perspective view from a front, left side of the air intake duct body of FIG. 7 with the honeycomb grille of FIG. 11 and a cap.

Referring now to FIG. 12, in certain embodiments, there is further provided a cap 110 for selectively covering the first intake duct branch inlet 86. The cap 110 is movably connected to the first intake duct branch 84 by a cap tether 112. The cap 110 includes a strap 114 with an opening 116 for engaging with a protrusion (not shown) on an outside of the first intake duct branch 84 to keep the cap 110 secured over the first intake duct branch inlet 86. It is contemplated that the strap 114 could be omitted.

In the present implementation, the air intake assembly 80 is generally disposed on a left side of the SSV 10 behind the left seat 28. It is contemplated that the entire air intake assembly 80 or at least parts thereof could be disposed on a right side of the SSV 10.

During operation of the engine, air enters the air intake body 82 through the second intake duct branch inlet 90 and the first intake branch inlet 86. As the second intake duct branch inlet 90 has a surface area that is larger than the first intake duct branch inlet 86, more air can enter through the second intake duct branch inlet 90 than the first intake duct branch inlet 86. Therefore, the second intake duct branch inlet 90 can be considered as a primary inlet of the air intake assembly 80, and the first intake duct branch inlet 86 can be considered as a secondary inlet of the air intake assembly 80. The air then flows out of the air intake duct outlet 92, through the first and second air intake conduits 100, 102, into the CVT housing 72 to cool the components of the CVT 70. The air then flows out of the CVT housing 72 via the exhaust conduit 120.

Turning now to FIGS. 13 to 20, another embodiment of an air intake assembly supplying air to the CVT 70 will be described. Broadly, air intake assembly 180 of FIGS. 13 to 20 differs from the air intake assembly 80 of FIGS. 1 to 12 in that two air inlets, a primary air inlet and a secondary air inlet, are defined in a single branch of an air intake body instead of in two separate branches. Whereas in the embodiment of FIGS. 1 to 12, the secondary air inlet (first intake duct branch inlet 86) opened in the cockpit area 26, in the embodiment of FIGS. 13 to 20, the secondary air inlet opens in the engine compartment 62, internal to the side panel 54. As with the embodiment of FIGS. 1 to 12, the primary air inlet opens to an atmosphere outside of the side panel 54. Therefore, it can be said that the primary and second air inlets of the embodiments of FIGS. 13 to 20 open, respectively, on either side of the side panel 54. The side panel 54 can be considered as a separator.

The air intake assembly 180 comprises an air intake duct body 182 defining passageways through which air can flow from the atmosphere to the interior of the CVT housing 72 to cool components of the CVT 70. The air intake assembly 180 is configured such that air can flow from the engine compartment 62 inside of the side panels 54, as well as from an area outside of the engine compartment 62 external to the side panels 54, into the CVT housing 72. Advantageously, as the atmosphere in the engine compartment 62 may be relatively cleaner air than the atmosphere outside of the engine compartment 62, there is a cleaner air source to the CVT 70 should the primary source of air be blocked.

Figure 13:
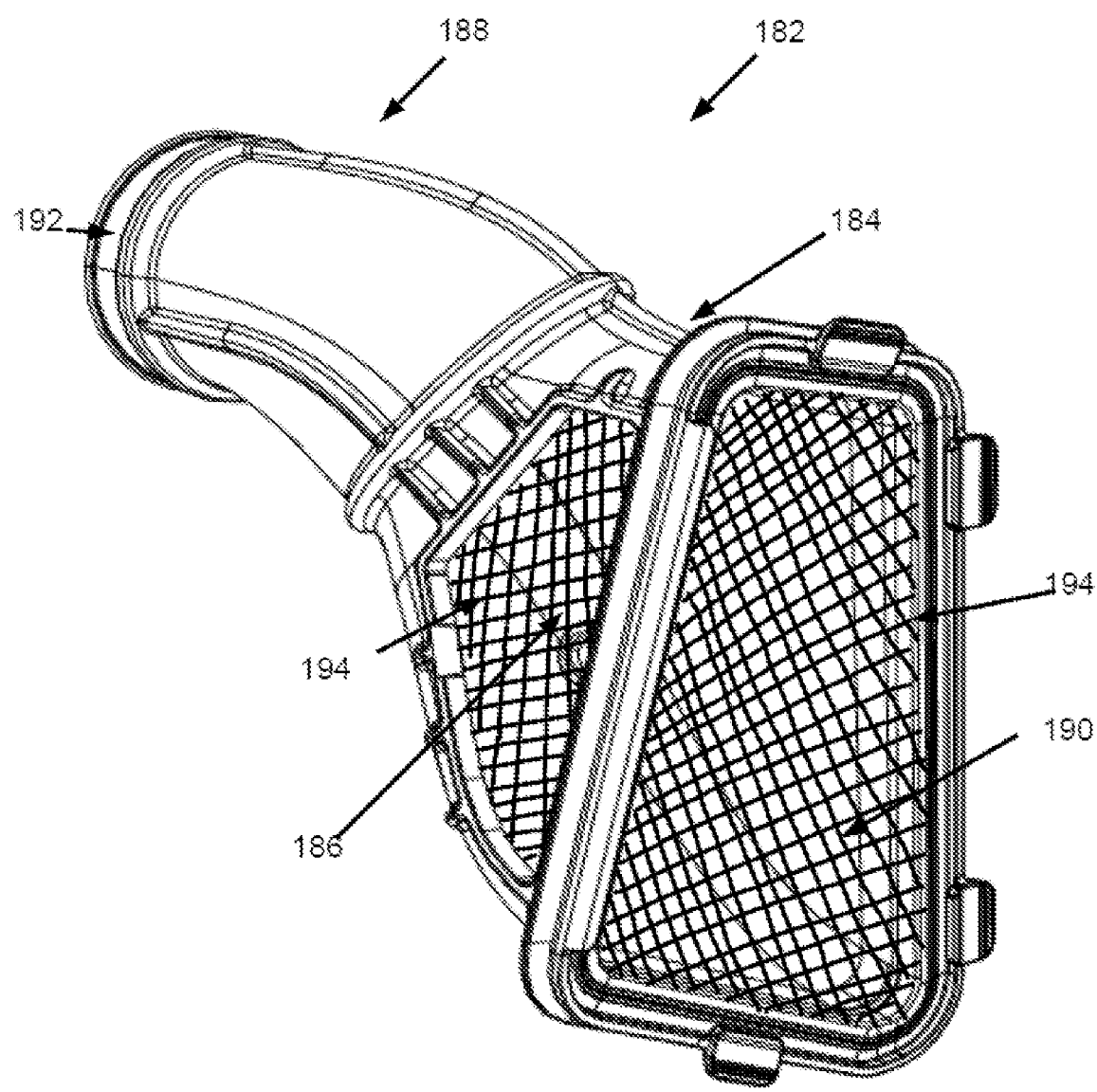
FIG. 13 is a perspective view from a front, left side of an air intake duct body of another embodiment of the air intake assembly of FIG. 3.
Figure 14:
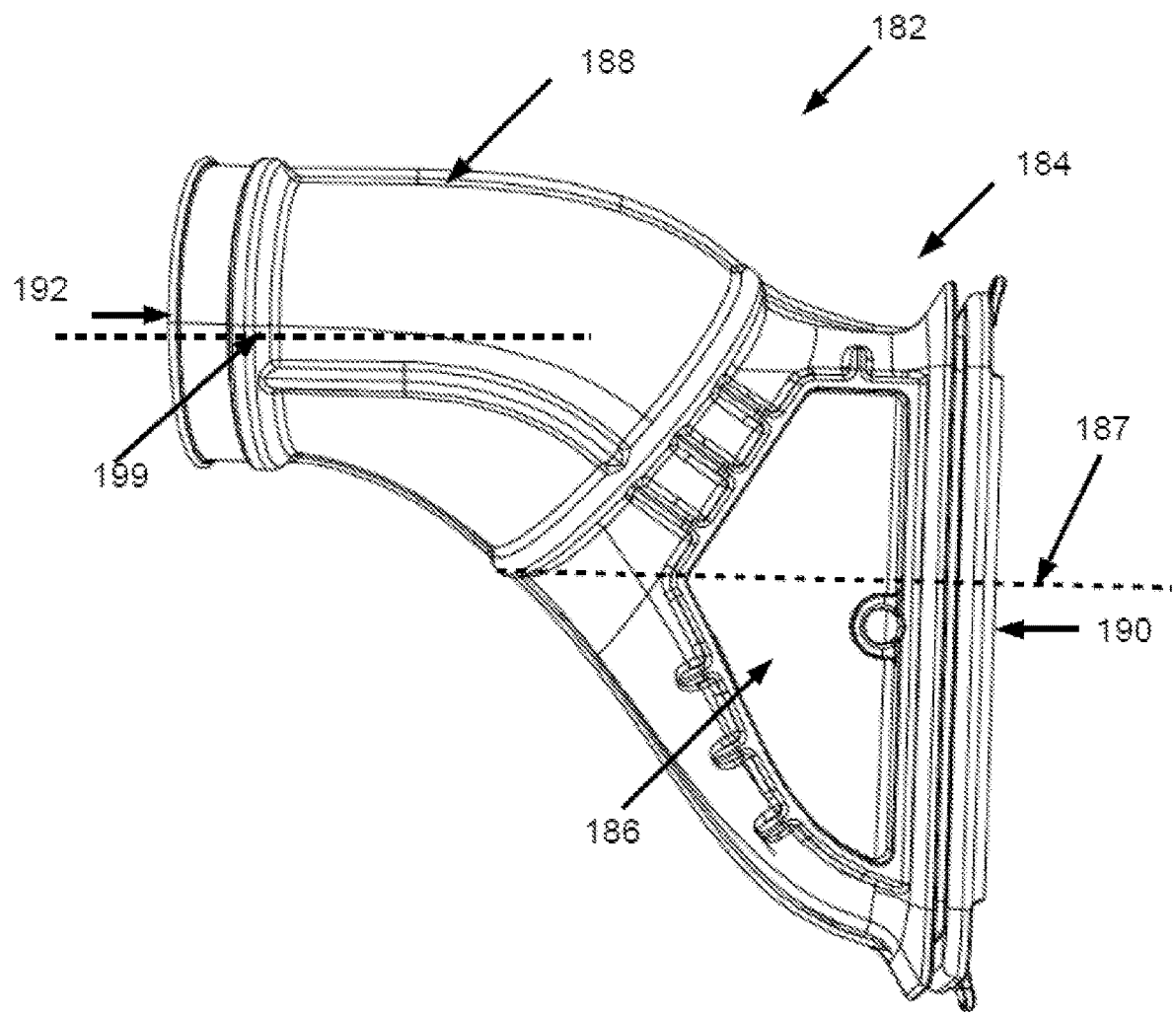
FIG. 14 is a front view of the air intake duct body of FIG. 13.

More specifically, and as seen in FIGS. 13 and 14, the air intake duct body 182 comprises an intake branch 184 having formed therein a first intake duct inlet 186 (secondary air inlet) and a second intake duct inlet 190 (primary air inlet). The air intake duct body 182 comprises an outlet branch 188 having formed therein an air intake duct outlet 192. The first intake duct inlet 186 and the second intake duct inlet 190 are in fluid communication with the air intake duct outlet 192. Air flowing in through one or both of the first intake duct inlet 186 and the second intake duct inlet 190 will flow out of the air intake duct outlet 192.

The air intake duct outlet 192 is fluidly connected to the CVT 70 via the first air intake conduit 100 which is fluidly connected to the second air intake conduit 102. The connection of the air intake duct body 182 to the first air intake conduit 100 is a removeable connection and utilizes an attachment member 94 which is a hose clamp as shown. It is contemplated that first intake conduit 100 and the second air intake conduit 102 may have a different configuration. It is also contemplated that the connection of the air intake duct body 182 to the first air intake conduit 100 can use another type of attachment member 94 such as a pipe clip, or can be in any other manner, such as using a screw connection between the air intake duct outlet 192 and the first air intake conduit 100. An exhaust conduit 120 is provided which extends from the CVT housing 72.

Figure 17:
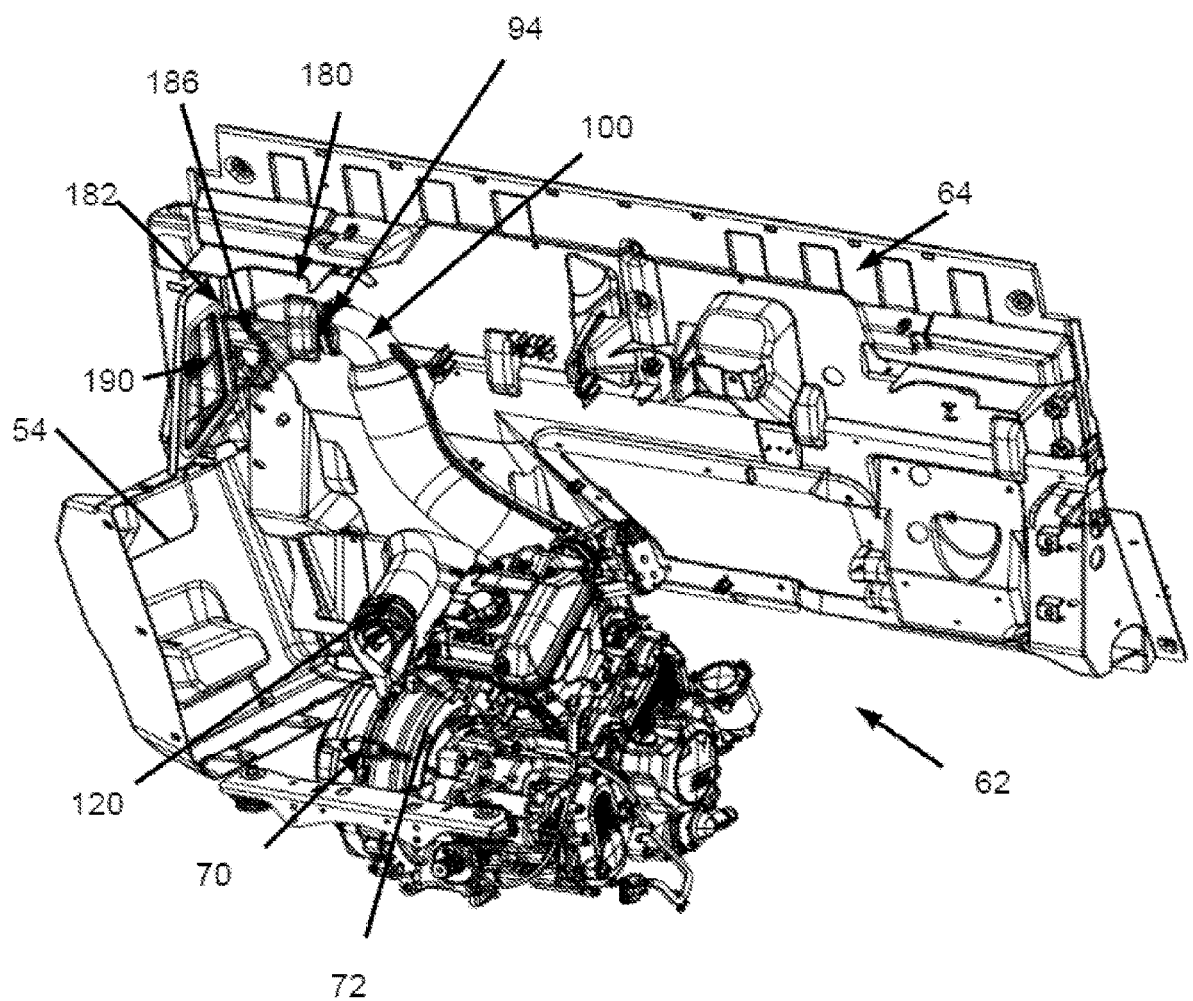
FIG. 17 is a perspective view from the from the rear, right side of the firewall, CVT housing, the engine and the air intake assembly of FIG. 15.
Figure 18:
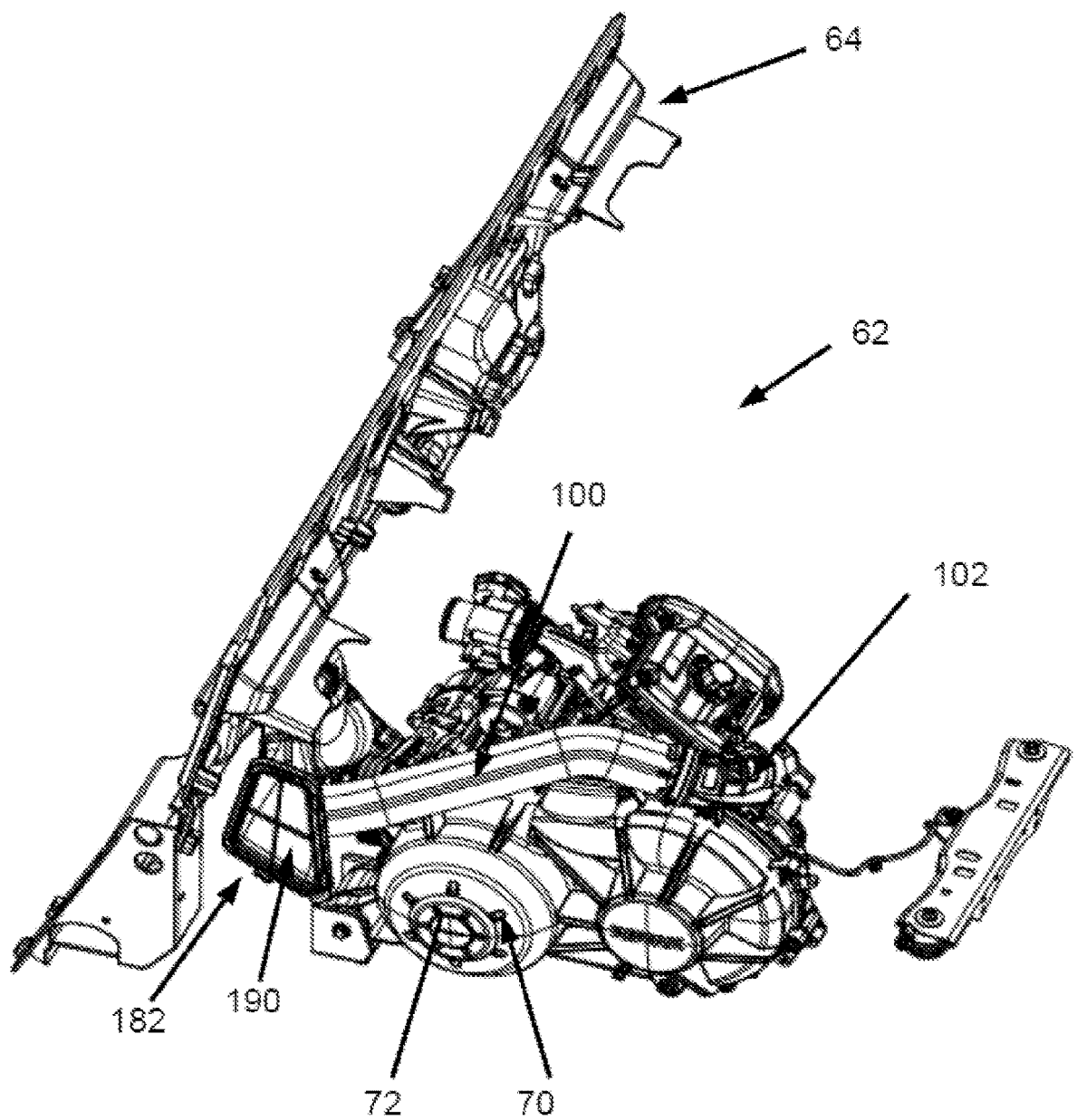
FIG. 18 is a perspective view from the from the rear, top, left side of the firewall, CVT housing, the engine and the air intake assembly of FIG. 15.
Figure 19:
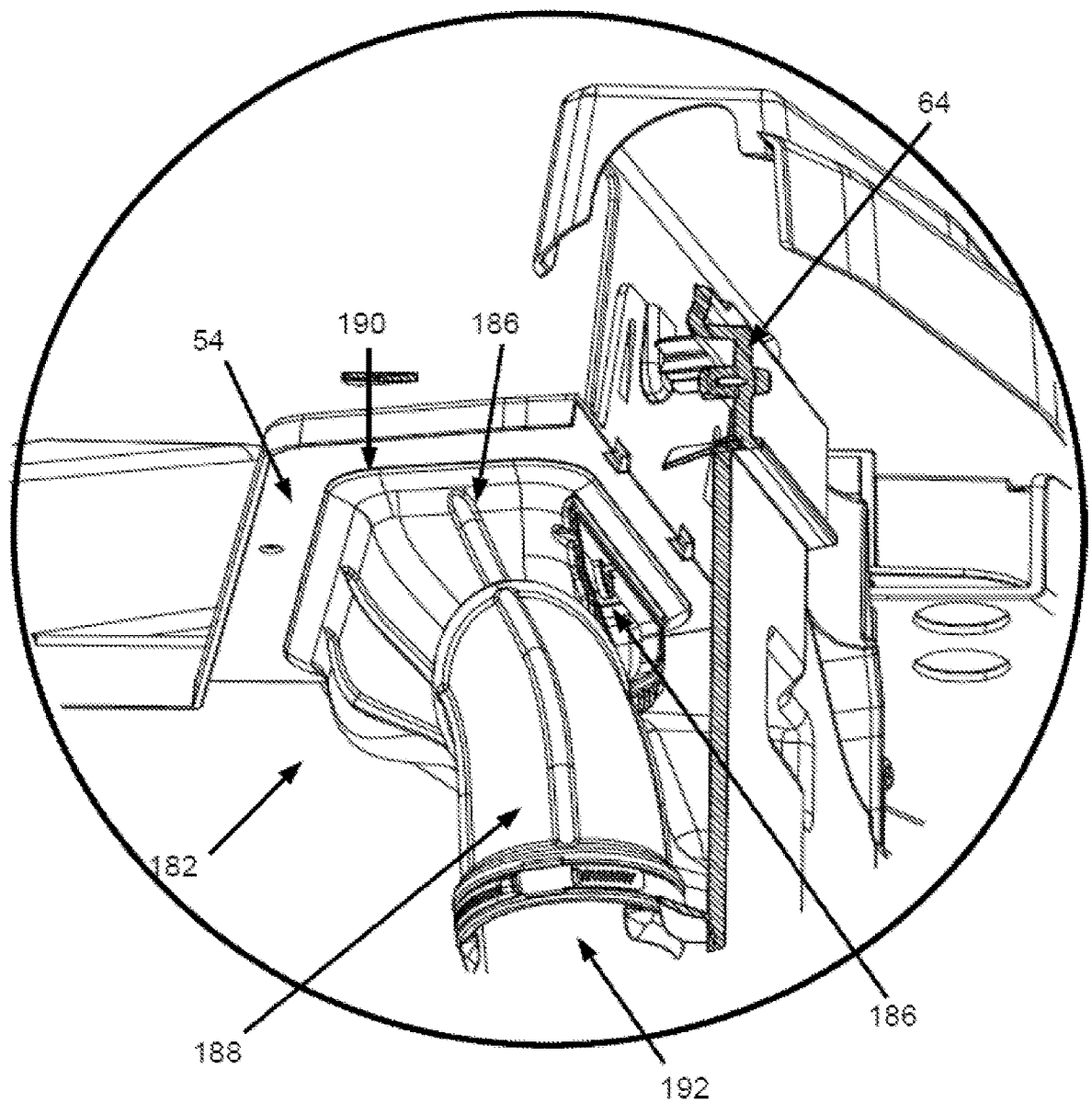
FIG. 19 is a close-up, top, right perspective view of the air intake assembly of FIG. 15, with a portion of the firewall removed.
Figure 20:
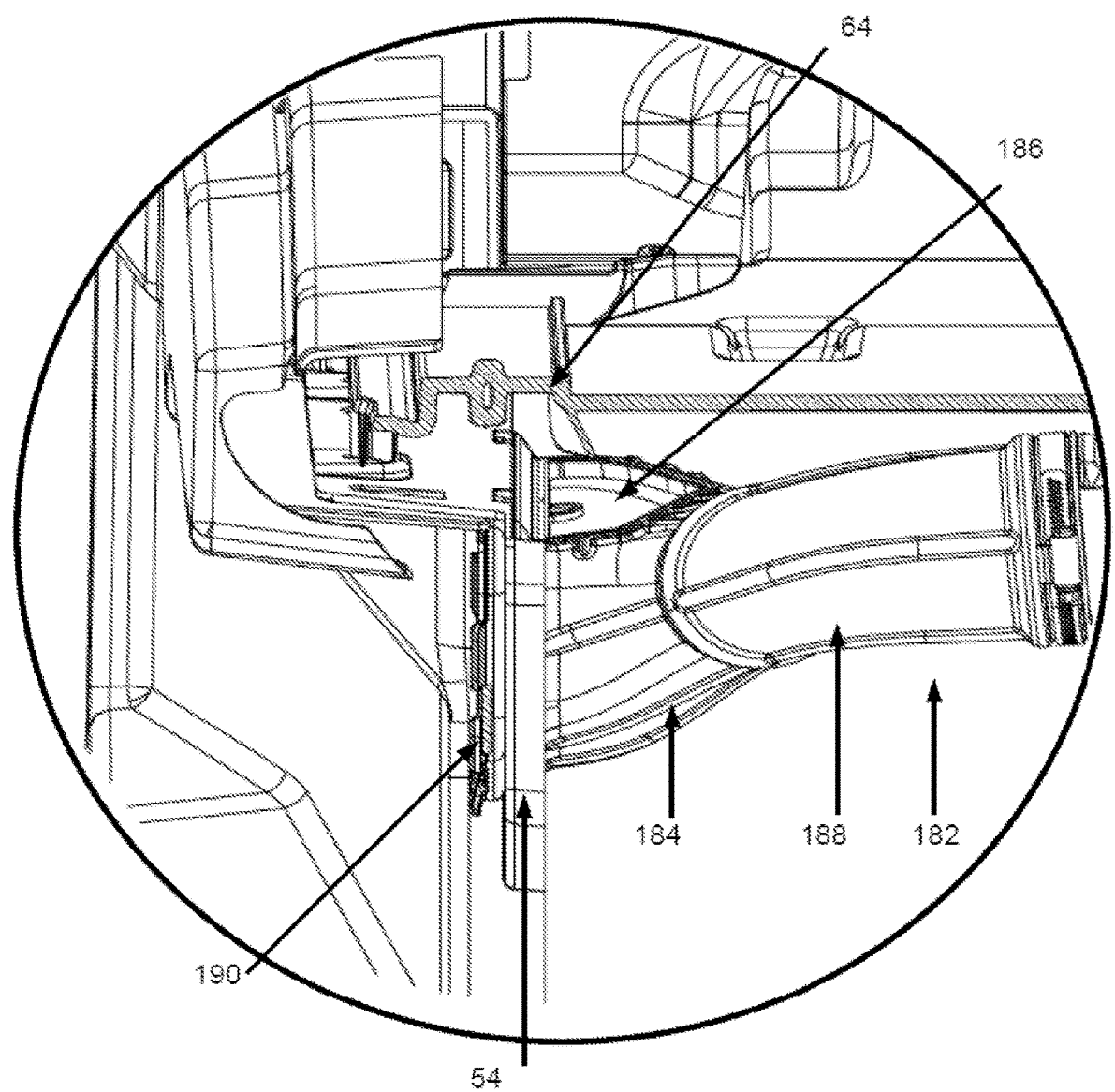
FIG. 20 is a top view of the air intake assembly of FIG. 19.

Turning back to the intake branch 184, the second intake duct inlet 190 is defined in an end of the intake branch 184, and the first intake duct inlet 186 is defined in a side of the intake branch 184. An end of the outlet branch 188 is oppositely facing the end of the intake branch 184. As seen in FIGS. 17, 19 and 20, the first intake duct inlet 186 is disposed in the engine compartment 62, whereas the second intake duct inlet 190 opens outside of the engine compartment 62. More specifically, the first intake duct inlet 186 and the second intake duct inlet 190 are separated by the panel 54 with the first intake duct inlet 186 opening to an atmosphere outside of the panel 54 and the second intake duct inlet 190 opening to an atmosphere inside of the panel 54.

Referring back to FIG. 14, the first intake duct inlet 186 and the second intake duct inlet 190 face in different directions to one another. A plane of the first intake duct inlet 186 is perpendicular to the plane of the second intake duct inlet 190. In other embodiments, the plane of the first intake duct inlet 186 may be from 85 degrees to 95 degrees to the plane of the second intake duct inlet 190. The first intake duct inlet 186 faces forwardly and upwardly. The second intake duct inlet 190 faces laterally.

As best seen in FIG. 19, the air intake duct outlet 192 has a perimeter which is circular in shape. As best seen in FIGS. 13 and 14, the first intake duct inlet 186 and the second intake duct inlet 190 have respective perimeters which are trapezoidal in shape. An area of the first intake duct inlet 186 is smaller than an area of the second intake duct inlet 190. The area of the first intake duct inlet 186 is larger than an area of the air intake duct outlet 192.

Referring to FIG. 14, the intake branch 184 has an intake branch axis 187 which is normal to a plane of the second intake duct inlet 190. The outlet branch 188 has an outlet branch axis 199 which is normal to a plane of the air intake duct outlet 192. The intake branch axis 187 and the outlet branch axis 199 are parallel or nearly parallel to each other. A relative angle between the intake branch axis 187 and the intake duct outlet axis 199 is 180 degrees. It is contemplated that the relative angle could be from 160 degrees to 200 degrees.

Figure 16:
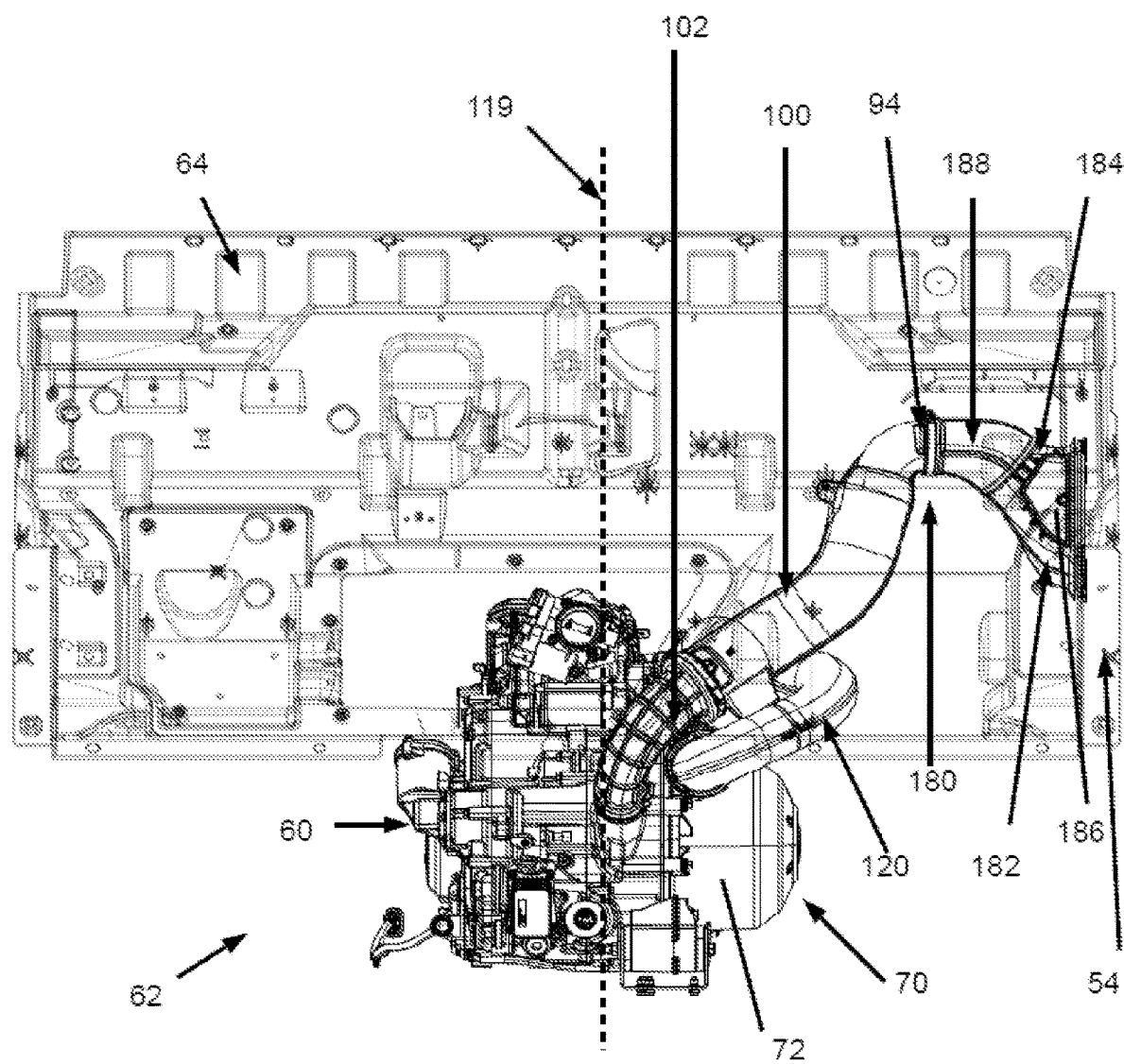
FIG. 16 is a front view of the firewall, CVT housing, the engine and the air intake assembly of FIG. 15, with the firewall shown in transparency.

As seen in FIG. 16, the intake branch 184 extends generally laterally and the first intake duct inlet 186 fluidly connects with the atmosphere through the left side panel 54 of the SSV 10 and generally faces towards the left of the SSV 10. The air intake duct outlet 192 and the intake branch 184 form a gooseneck (curved with an apex near a top end thereof) to reduce a likelihood of water droplets entering the CVT housing 72.

Figure 15:
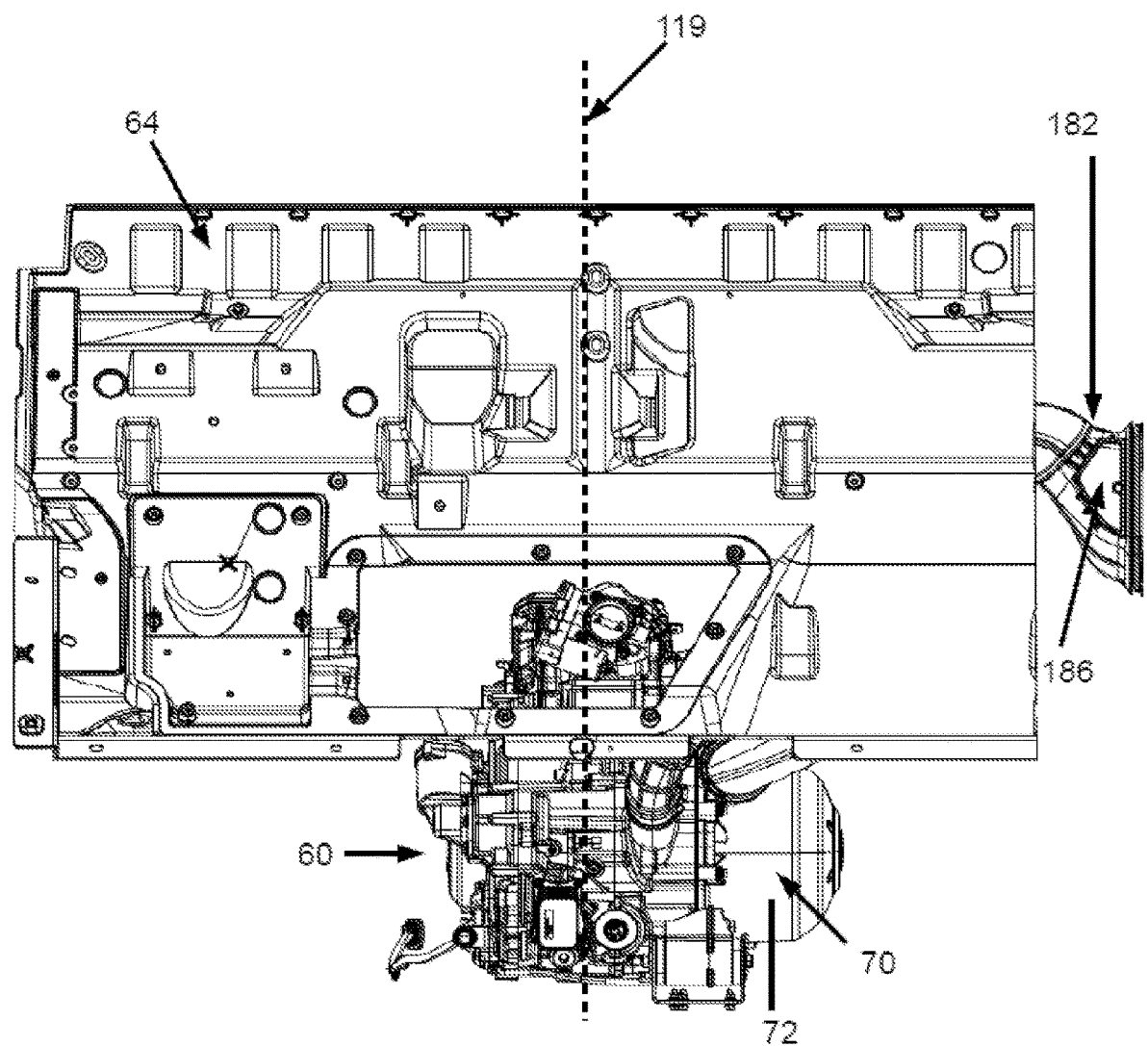
FIG. 15 is a front view of a vehicle with a front portion of the vehicle removed to show a front side of a firewall, a continuously variable transmission (CVT) housing rearward of the firewall, an engine and a portion of an air intake duct assembly including the air intake duct body of FIG. 13.

As best seen in FIGS. 15 and 16, the air intake duct body 182 is disposed such that the first intake duct inlet 186 and the second intake duct inlet 190 are both positioned on a same side of a longitudinally extending vertical center plane 119 of the vehicle. The air intake duct body 182 and the air intake assembly 180 are generally disposed on a left side of the SSV 10 behind the left seat 28. It is contemplated that the entire air intake assembly 180 or at least parts thereof could be disposed on a right side of the SSV 10.

The first intake duct inlet is disposed rearward of a backrest of the driver seat 28 of the vehicle. The first intake duct inlet 186 is disposed at a height below a headrest 28C of the driver seat 28. The first intake duct inlet 186 is disposed to a side of the driver seat 28. The first intake duct inlet 186 is disposed rearward of the firewall 64 and forward of the internal combustion engine 60. The first intake duct inlet 186 faces the firewall 64.

Referring now to FIG. 13, the first intake duct inlet 186 is provided with a mesh 194 as a barrier to debris. The mesh 194 may be hydrophobic. The second intake duct inlet 190 is also provided with a mesh 194 as a barrier to debris. The mesh 194 may also be hydrophobic.

During operation of the engine 60, air enters the air intake body 182 through the second intake duct inlet 190 and the first intake inlet 186. As the second intake duct inlet 190 has a surface area that is larger than the first intake duct inlet 186, more air can enter through the second intake duct inlet 190 than the first intake duct branch inlet 186. The air then flows out of the air intake duct outlet 192, through the first and second air intake conduits 100, 102, into the CVT housing 72 to cool the components of the CVT 70. The air then flows out of the CVT housing 72 via the exhaust conduit 120.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame;
   at least one ground engaging member operatively connected to the frame;
   an internal combustion engine connected to the frame;
   a continuously variable transmission (CVT) operatively connected to the engine;
   a CVT housing housing the CVT;
   a cockpit area defined at least in part by the frame;
   an air intake assembly fluidly connected to the CVT housing, the air intake assembly comprising an air intake duct body having:
      an air intake duct outlet in fluid communication with an inside of the CVT housing;
      at least two intake duct branches, each intake duct branch having a respective intake duct branch inlet fluidly connected to the air intake duct outlet, wherein a first intake duct branch of the at least two intake duct branches is in fluid communication with the cockpit area to fluidly connect an inside of the CVT housing with the cockpit area, the first intake duct branch having a first intake duct branch inlet.

2. The vehicle of claim 1, further comprising a firewall between the cockpit area and the internal combustion engine, wherein the first intake duct branch is fluidly connected to the cockpit area through a firewall opening defined in the firewall.

3. The vehicle of claim 1, wherein the first intake duct branch is connected to a rear side of the firewall.

4. The vehicle of claim 1, wherein a second intake duct branch of the at least two intake duct branches, is disposed outside of the cockpit area, the second intake duct branch having a second intake duct branch inlet.

5. The vehicle of claim 4, wherein the first intake duct branch inlet of the first intake duct branch has an area which is smaller than the second intake duct branch inlet of the second intake duct branch.

6. The vehicle of claim 4, wherein the first intake duct branch has a first intake duct axis which is normal to a plane of the first intake duct branch inlet, and the second intake duct branch has a second intake duct axis which is normal to a plane of the second intake duct branch inlet, the first intake duct axis and the second intake duct axis being positioned at ≥85 degrees relative to each other.

7. The vehicle of claim 1, wherein the second intake duct branch inlet of the second intake duct branch is aligned with an intake duct outlet axis of the air intake duct outlet, the intake duct outlet axis being normal to a plane of the air intake duct outlet.

8. The vehicle of claim 1, wherein the first intake duct branch inlet is disposed rearward of a backrest of a driver seat in the cockpit area.

9. The vehicle of claim 8, wherein the first intake duct branch inlet is disposed at a height below a headrest of the driver seat.

10. The vehicle of claim 1, wherein the air intake duct body is disposed such that the first intake duct branch and the second intake duct branch are both positioned on a same side of a longitudinally extending vertical center plane of the vehicle.

11. The vehicle of claim 1, further comprising a cap for selectively covering the first intake duct branch inlet of the first intake duct branch.

12. The vehicle of claim 1, further comprising a grill which is attachable to the first intake duct branch inlet of the first intake duct branch.

13. The vehicle of claim 1, wherein the first intake duct branch extends generally longitudinally towards the cockpit area.

14. The vehicle of claim 1, wherein the second intake duct branch is configured to fluidly communicate with an environment of the vehicle through a side panel of the vehicle.

15. The vehicle of claim 1, wherein the first intake duct branch and the second intake duct branch are configured so that, during use, air flows through the first intake duct branch and the second intake duct branch towards the air intake duct outlet.

16. An air intake assembly which is configured to be fluidly connectable to a continuously variable transmission (CVT) housing housing a CVT of a vehicle, the vehicle having:
  a frame;
  at least one ground engaging member operatively connected to the frame;
  an internal combustion engine connected to the frame;
  the CVT operatively connected to the engine;
  a cockpit area defined at least in part by the frame;
the air intake assembly comprising an air intake duct body having:
  an air intake duct outlet configured to be in fluid communication with an inside of the CVT housing when the air intake assembly is connected to the CVT housing;
  at least two intake duct branches, each intake duct branch having a respective intake duct branch inlet fluidly connected to the air intake duct outlet, wherein a first intake duct branch of the at least two intake duct branches is configured to be in fluid communication with the cockpit area when the air intake assembly is connected to the CVT housing to fluidly connect an inside of the CVT housing with the cockpit area, the first intake duct branch having a first intake duct branch inlet.

17. The air intake assembly of claim 16, wherein a second intake duct branch of the at least two intake duct branches is configured to be disposed outside of the cockpit area, the second intake duct branch having a second intake duct branch inlet.

18. The air intake assembly of claim 16, wherein the second intake duct branch inlet of the second intake duct branch is aligned with an intake duct outlet axis of the air intake duct outlet, the intake duct outlet axis being normal to a plane of the air intake duct outlet.

19. The air intake assembly of claim 16, further comprising a cap for selectively covering the first intake duct branch inlet of the first intake duct branch.

20. An air intake duct body for supplying air to a continuously variable transmission (CVT) housing housing a CVT of a vehicle, the air intake duct body comprising:
  an air intake duct outlet configured to be fluidly connected to the CVT;
  a first intake duct branch having a first intake duct branch inlet and a first intake duct branch outlet, and
  a second intake duct branch having a second intake duct branch inlet fluidly communicating with the air intake duct outlet, the first intake duct branch outlet being defined in the second intake duct branch for fluidly communicating the first intake duct branch with the second intake duct branch,
  the first intake duct branch and the second intake duct branch extending in different directions to one another.

\* \* \* \* \*